United States Patent
Takano et al.

(10) Patent No.: US 6,434,580 B1
(45) Date of Patent: Aug. 13, 2002

(54) SYSTEM, METHOD, AND RECORDING MEDIUM FOR DRAFTING AND PREPARING PATENT SPECIFICATIONS

(75) Inventors: Kouichi Takano; Akira Shiramizu; Hiroyuki Kubo; Fumio Imoto, all of Tokyo; Kouichi Shimamura; Daisuke Furusawa, both of Kanagawa, all of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/177,612

(22) Filed: Oct. 23, 1998

(30) Foreign Application Priority Data

Oct. 24, 1997 (JP) ............................................. 9-292803

(51) Int. Cl.[7] .......................... G06F 7/00; G06F 15/00; G06F 17/60
(52) U.S. Cl. ............................ 707/530; 707/511; 704/9; 705/1
(58) Field of Search ................................. 707/530, 507, 707/2, 203, 511, 512; 704/4, 9; 705/1, 9

(56) References Cited

U.S. PATENT DOCUMENTS

| | | | | |
|---|---|---|---|---|
| 5,175,681 A | * | 12/1992 | Iwai et al. ........................ | 705/9 |
| 5,754,840 A | * | 5/1998 | Rivette et al. ................... | 707/2 |
| 5,774,833 A | * | 6/1998 | Newman ........................... | 704/9 |
| 5,890,177 A | * | 3/1999 | Moody et al. ................... | 707/511 |
| 5,903,858 A | * | 5/1999 | Saraki .............................. | 704/4 |
| 5,991,780 A | * | 11/1999 | Rivette et al. ................... | 707/512 |
| 6,014,663 A | * | 1/2000 | Rivette et al. ................... | 707/4 |
| 6,049,811 A | * | 4/2000 | Petruzzi et al. ................. | 707/507 |
| 6,239,802 B1 | * | 5/2001 | Lahey et al. .................... | 707/203 |
| 6,298,327 B1 | * | 10/2001 | Hunter et al. ................... | 705/1 |

FOREIGN PATENT DOCUMENTS

JP         9-91349          4/1997

OTHER PUBLICATIONS

Scuderi, Stephen P., Evaluation of 'Patent Pro', A Patent Application Drafting Software Program, pp. 1–19, downloaded on Aug. 14, 2001 from url <http://www.ipmall.f-plc.edu/ipcorner/bp98/scuderi.htm>.*

* cited by examiner

Primary Examiner—Stephen S. Hong
Assistant Examiner—William L. Bashore
(74) Attorney, Agent, or Firm—Young & Thompson

(57) ABSTRACT

A client computer 100 enters with a draft preparation means 100 a piece of draft data prepared by an inventor, and transmits with a draft uploading means 103 the draft data and a piece of invention report information to a server computer 300. The server computer 300 receives with a draft receiving means 301 the transmitted pieces of draft data and invention report information, and enters them with a draft entry means 302 into a specification file 303, the data and the information being associated with each other. A client computer 200 transfers with a draft downloading means 201 the draft data entered in the server computer 300, revises with a draft revision means 202 the draft data, and transmits with a draft uploading means 203 the revised draft data to the server computer 300.

14 Claims, 18 Drawing Sheets

|  | INVENTION REPORT | | | | 10 |
|---|---|---|---|---|---|

(TO BE FILLED BY INVENTOR)                         18

| REF. NO. 11 | FILE NAME |
|---|---|

| TITLE OF INVENTION | |
|---|---|

| INVENTOR | | | | | 12 |
|---|---|---|---|---|---|
| EMPLOYEE ID NO. | INVENTOR'S NAME | TEL. (EXT.) TEL. (LINE) | E-MAIL FAX (LINE) | ASSIGNED DEPARTMENT | |
| 1 |  |  |  |  |  |
| 2 |  |  |  |  |  |

| REF. NO. | TITLE OF INVENTION | INVENTOR'S NAME | EMPLOYEE ID NO. | ASSIGNED DEPT. | TEL. (EXT.) | ≀≀ | DRAFT DATA STORAGE ADDRESS |
|---|---|---|---|---|---|---|---|
| | | | | | | ≀≀ | |
| | | | | | | | |
| 21 | 22 | 23 | 24 | 25 | 26 | | 27 |

| | LIST OF INVENTION REPORT INFORMATION | | | | 40 |
|---|---|---|---|---|---|
| ITEM NO. ↓ | REF. NO. | TITLE OF INVENTION | INVENTOR'S NAME | ASSIGNED DEPARTMENT | TEL. (EXT.) TEL. (LINE) |
| 1 | | | | | |
| 2 | | | | | |
| 3 | | | | | |
| 4 | | | | | |

FIG.5

| REF. NO. | TITLE OF INVENTION | INVENTOR'S NAME | EMPLOYEE ID NO. | ASSIGNED DEPT. | TEL. (EXT.) | 〜〜 | DRAFT DATA STORAGE ADDRESS | GAZETTE DATA STORAGE ADDRESS |
|---|---|---|---|---|---|---|---|---|
| | | | | | | 〜〜 | | |
| | | | | | | | | |
| 21 | 22 | 23 | 24 | 25 | 26 | | 27 | 28 |

Figure 17:
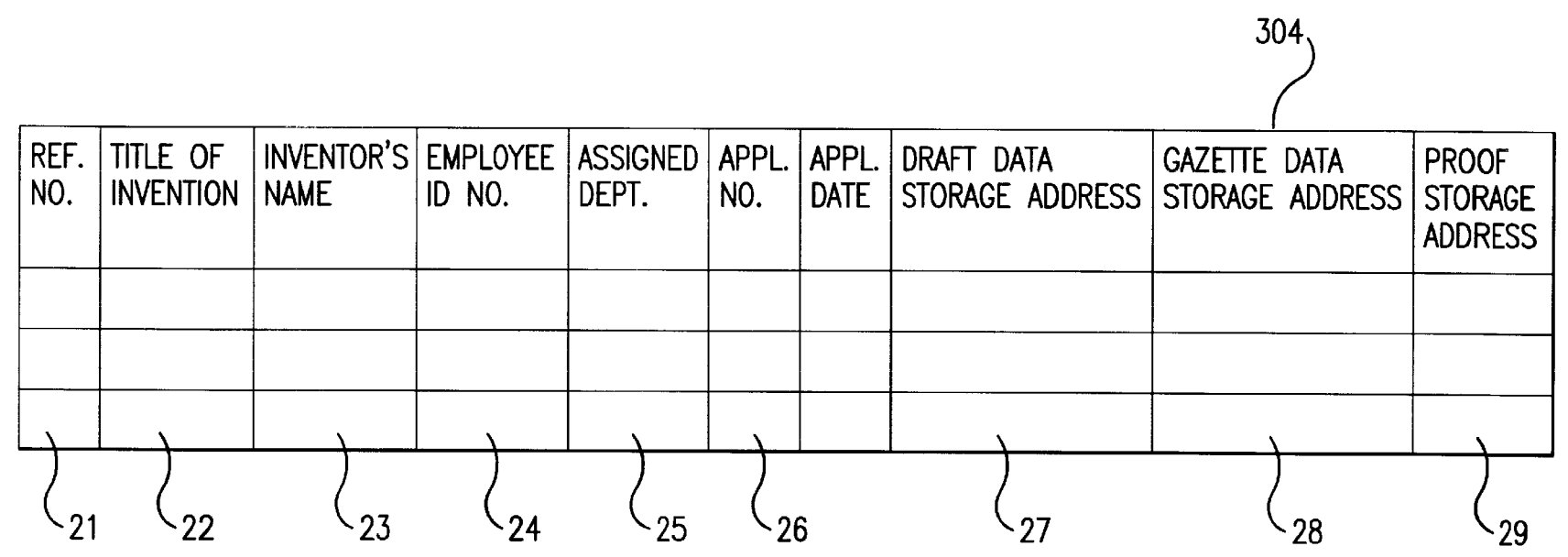

| REF. NO. | TITLE OF INVENTION | INVENTOR'S NAME | EMPLOYEE ID NO. | ASSIGNED DEPT. | APPL. NO. | APPL. DATE | DRAFT DATA STORAGE ADDRESS | GAZETTE DATA STORAGE ADDRESS | PROOF STORAGE ADDRESS |
|---|---|---|---|---|---|---|---|---|---|
| | | | | | | | | | |
| | | | | | | | | | |
| | | | | | | | | | |

SYSTEM, METHOD, AND RECORDING MEDIUM FOR DRAFTING AND PREPARING PATENT SPECIFICATIONS

BACKGROUND OF THE INVENTION

1. Field of the Invention

The present invention relates to a system for preparing patent specifications, a method for preparing patent specifications, and a storage medium recording thereon a program for preparing patent specifications, and more particularly to a system for preparing patent specifications, a method for preparing patent specifications, and a storage medium recording thereon a program for preparing patent specifications with inventors and persons in change of filing patent applications using a plurality of computers connected to a communication network, such as Internet, for preparing patent specifications for patent applications.

2. Description of the Related Art

A conventional system for managing bibliographic data of industrial properties is disclosed in Japanese Patent Application Laid-Open No. Hei 9-91349. The conventional bibliographic-data management system is provided with an attorney-side computer located at a patent law firm and a client-side computer placed at an applicant's office, for instance, the intellectual property division of a company. The attorney-side computer comprises an input unit, a transmitting unit, an attorney-side memory unit, and an attorney-side data update unit. The client-side computer includes a client-side memory unit, a receiving unit, and a client-side data update unit.

The conventional bibliographic-data management system with such a construction as described above operates as follows:

In the attorney-side computer, an patent attorney enters from the input unit bibliographic items relating to various procedures each time the patent attorney performs those procedures, for example, during the prosecution of a patent application. The transmitting unit transmits both the bibliographic items for the patent application entered from the input unit and a reference number assigned to the patent application through a communication line to the client-side computer. At the same time, in accordance with the bibliographic items entered from the input unit, the data update unit updates procedure history data which are stored in the attorney-side memory unit and indicate the histories of procedures conducted for patent applications handled by the patent law firm.

Meanwhile, in the client-side computer, the receiving unit receives the bibliographic items and the reference number for the patent application transmitted through the communication line by the attorney-side computer. In accordance with the bibliographic items and the reference number, the client-side data update unit updates procedure history data stored in the client-side memory unit so that they become substantially the same as those in the attorney-side memory unit.

The conventional system described above merely delivers bibliographic data, entered by the attorney into the attorney-side computer and stored into the attorney-side memory unit, over the communication line to the client-side computer to be stored into the client-side memory unit, but is not designed to prepare patent application documents including a specification while each of the attorney-side computer and the client-side computer transmit to the other, and receive from the other, relevant data.

SUMMARY OF THE INVENTION

An object of the present invention is to provide a system capable of preparing data for patent application documents by the transmission and reception of draft data via a server computer between a client computer used by an inventor preparing the draft data for a specification to be included in his or her patent application and another client computer used by patent-application-filing persons including a patent attorney revising the draft data.

According to first aspect of the invention, there is provided a system for preparing patent specifications which comprises a first computer, a second computer and a third computer connected to one another via a communication network. Said first computer comprises a draft preparation means for entering patent specification draft data of a patent specification prepared by an inventor; a draft uploading means for transmitting to said second computer respective patent specification draft data entered from said draft specification preparation means and a piece of invention report information for identifying the respective patent specification draft data; a first draft downloading means for fetching from said second computer draft data corresponding to a piece of invention report information designated by said inventor; a draft amending means for amending the draft data fetched by the first draft downloading means in accordance with an instruction by said inventor; and an amended draft uploading means for transmitting to said second computer the draft data amended by the draft amending means and the piece of invention report information designated by said inventor. Said second computer comprises a specification file memory means, and a draft entry means for entering respective patent specification draft data and said piece of invention report information for identifying the respective draft data, transmitted from said first and third computers into said specification memory means, with the respective draft data and the pieces of invention report information being associated with each other. Said third computer comprises a second draft downloading means for fetching from said second computer patent specification draft data corresponding to a piece of invention report information designated by a patent-application-filing person; a draft revision means for revising the draft data fetched by the second draft downloading means in accordance with an instruction by said patent-application-filing person; and a revised draft uploading means for transmitting to said second computer the draft data revised by said draft revision means and the piece of invention report information designated by said patent-application-filing person.

According to second aspect of the invention, there is provided a system for preparing patent specifications which comprises a first computer, a second computer, a third computer and fourth computer connected to one another via a communication network. Said first computer comprises a draft preparation means for entering patent specification draft data of a patent specification prepared by an inventor; a draft uploading means for transmitting to said second computer respective patent specification draft data entered from said draft specification preparation means and a piece of invention report information for identifying the respective patent specification draft data; a first draft downloading means for fetching from said second computer draft data corresponding to a piece of invention report information designated by said inventor; a draft amending means for amending the draft data fetched by the first draft downloading means in accordance with an instruction by said inventor; and an amended draft uploading means for transmitting to said second computer the draft data amended by the draft amending means and the piece of invention report information designated by said inventor. Said second computer comprises a specification file memory means, and a draft entry means for entering respective patent specification draft data and said piece of invention report information for identifying the respective draft data, transmitted from said first and fourth computers into said specification memory means, with the respective draft data and the pieces of invention report information being associated with each other. Said third computer comprises an entry means for referencing, when patent specification draft data are transmitted from said first computer to said second computer, the patent specification draft data, searching a prior art reference database for reference data on the basis of the contents of the invention indicated by the patent specification draft data, associating searched reference data with the patent specification draft data and entering them into said specification file memory means. Said fourth computer comprises a second draft downloading means for fetching from said second computer patent specification draft data corresponding to a piece of invention report information designated by a patent-application-filing person and reference data related thereto; a draft revision means for revising the draft data fetched by the second draft downloading means in accordance with an instruction by said patent-application-filing person having referenced to the related reference data fetched together with the draft data; and a revised draft uploading means for transmitting to said second computer the draft data revised by said draft revision means and the piece of invention report information designated by said patent-application-filing person.

According to third aspect of the invention, there is provided a method for preparing patent specifications which includes: a draft preparation step for a first computer to enter patent specification draft data for a patent specification prepared by an inventor; a draft uploading step for said first computer to transmit to a second computer respective patent specification draft data entered at said draft preparation step and a piece of invention report information for identifying the respective patent specification draft data; a draft entry step for said second computer to enter respective patent specification draft data and said piece of invention report information for identifying the respective draft data, transmitted from said first computer, the data and the information being associated with each other, into a specification file memory means; a second draft downloading step for a third computer to fetch from said second computer patent specification draft data corresponding to a piece of invention report information designated by a patent-application-filing person; a draft revision step for said third computer to revise the draft data fetched at said second draft downloading step in accordance with an instruction by said patent-application-filing person; a revised draft uploading step for said third computer to transmit to said second computer the draft data revised at said draft revision step and the piece of invention report information designated by said patent-application-filing person; a revised draft entry step for said second computer to enter respective patent specification draft data and said piece of invention report information transmitted from said third computer, the data and the information being associated with each other, into said specification file memory means; a first draft downloading step for said first computer to fetch from said second computer draft data corresponding to a piece of invention report information designated by said inventor; a draft amending step for said first computer to amend the draft data fetched at said first draft downloading step in accordance with an instruction by said inventor; and a amended draft uploading step for said first computer to transmit to said second computer the draft data amended at said draft amending step and the piece of invention report information designated by said inventor.

According to fourth aspect of the invention, there is provided a method for preparing patent specifications which includes: a draft preparation step for a first computer to enter patent specification draft data for a patent specification prepared by an inventor; a draft uploading step for said first computer to transmit to a second computer respective patent specification draft data entered at said draft preparation step and a piece of invention report information for identifying the respective patent specification draft data; a draft entry step for said second computer to enter respective patent specification draft data and said piece of invention report information for identifying the respective draft data, transmitted from said first computer, the data and the information being associated with each other, into a specification file memory means; an entry step for a third computer to reference, when patent specification draft data are transmitted from said first computer to said second computer, the patent specification draft data, search a prior art reference database for reference data on the basis of the contents of the invention indicated by the patent specification draft data, associate searched reference data with the patent specification draft data and enter them into said specification file memory means; a second draft downloading step for a fourth computer to fetch from said second computer patent specification draft data corresponding to a piece of invention report information designated by patent-application-filing person and reference data related thereto; a draft revision step for said fourth computer to revise the draft data fetched at said second draft downloading step in accordance with an instruction by said patent-application-filing person having referenced to the related reference data fetched together with the draft data; a revised draft uploading step for said fourth computer to transmit to said second computer the draft data revised at said draft revision step and said piece of invention report information designated by said patent-application-filing person; a revised draft entry step for said second computer to enter respective patent specification draft data and said piece of invention report information for identifying the respective draft data, transmitted from said fourth computer, the data and the information being associated with each other, into said specification file memory means; a first draft downloading step for said first computer to fetch from said second computer draft data corresponding to a piece of invention report information designated by said inventor; a draft amending step for said first computer to amend the piece of draft data fetched at said first draft downloading step in accordance with an instruction by said inventor; and a amended draft uploading step for said first computer to transmit to said second computer the draft data amended at said draft amending step and the piece of invention report information designated by said inventor.

BRIEF DESCRIPTION OF THE DRAWINGS

The invention will be understood more fully from the detailed description given below and from the accompanying drawings of preferred embodiments thereof, which, however, should not be regarded as limiting the invention but are only intended for explanation and as aid to understanding.

FIG. 3 illustrates an input screen for invention report information in the first preferred embodiment of the invention.

FIG. 4 illustrates the contents of the specification file management 304 in the first embodiment of the invention.

FIG. 5 illustrates an example of list of a piece of invention report information in the first embodiment of the invention.

FIG. 14 illustrates the contents of the specification file management 304 in the fifth embodiment of the invention.

FIG. 17 illustrates the contents of the specification file management 304 in the sixth embodiment of the invention.

Here, it should be noted that like reference numerals represent like elements throughout the disclosure.

DETAILED DESCRIPTION OF THE PREFERRED EMBODIMENTS

Next will be described the present invention in detail with reference to the drawings.

First will be described in detail a first preferred embodiment of the invention.

Figure 1:
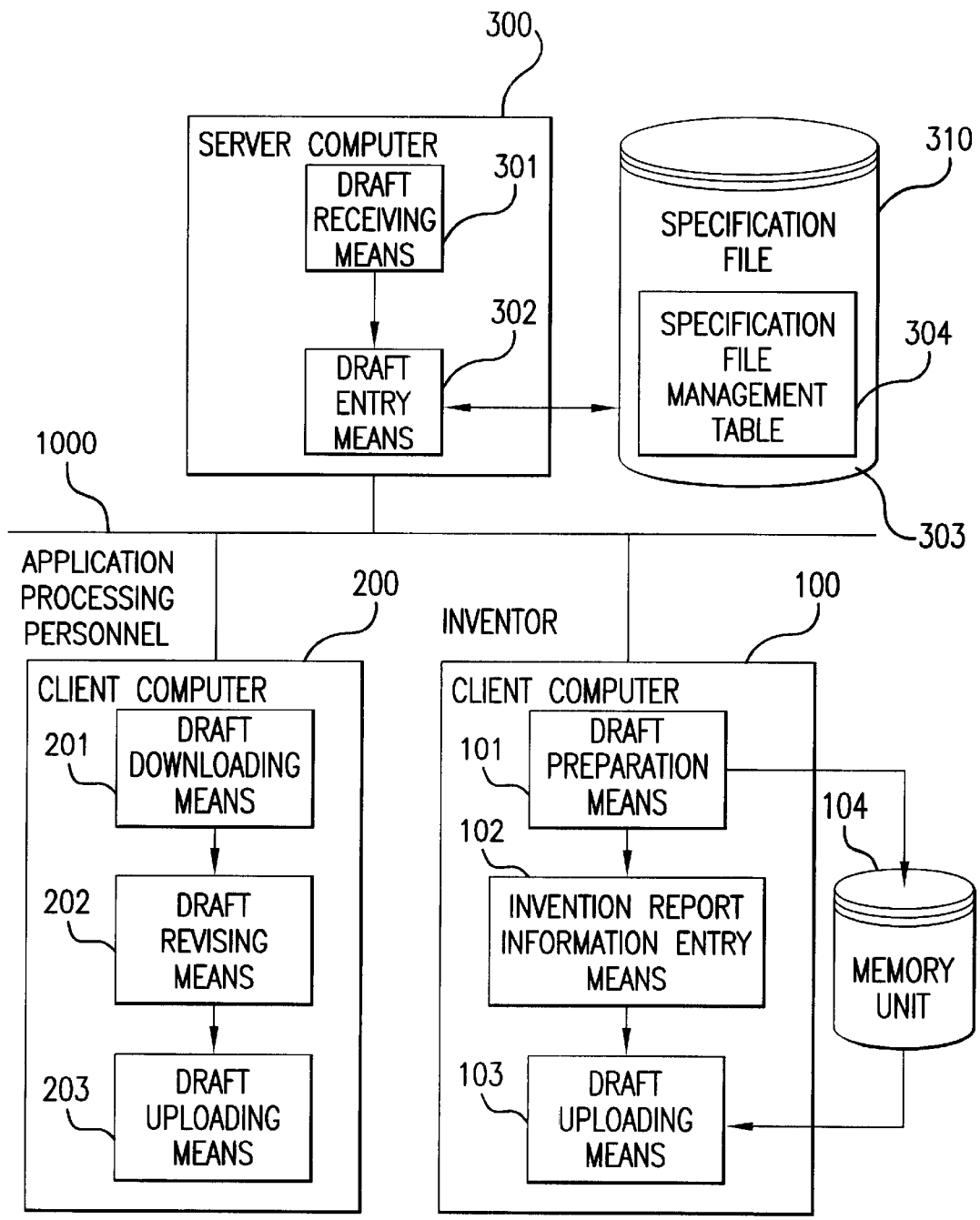
FIG. 1 is a block diagram illustrating the configuration of a first preferred embodiment of the invention.
Figure 2:
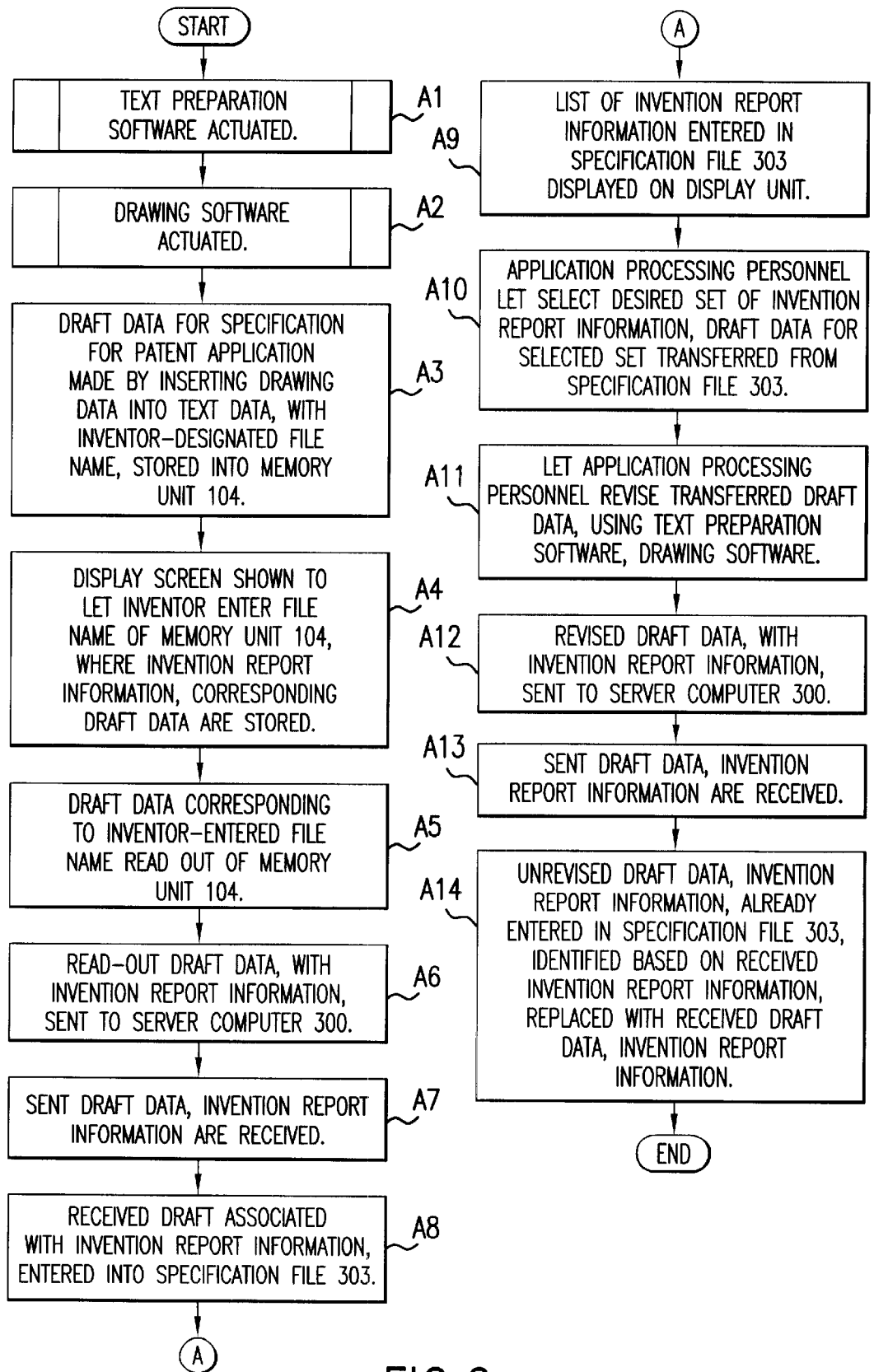
FIG. 2 is a flow chart showing a flow of operation in the first embodiment of the invention.

Referring to FIG. 1, the first preferred embodiment of the invention consists of a client computer 100, a memory unit 104 connected to this computers 100, a client computer 200, a server computer 300, and a memory unit 310 connected to this computer 300. These computers 100, 200 and 300 operate under programmed control, and are connected to one another via a communication network such as Internet.

The client computer 100 comprises a draft preparation means 101, an invention report information entry means 102, and a draft uploading means 103.

The draft preparation means 101 is used by an employee or the like of a company (hereinafter referred to as "inventor") for preparing draft data on a specification for patent application to report on an invention made by the inventor as part of his or her duty in the company to the department of the company responsible for patent application processing.

The invention report information entry means 102 is used by the inventor for entering a piece of invention report information (including a reference number, the inventor's name, and the title of the invention) pertaining to (for identifying) the draft data prepared by the draft preparation means 101.

The draft uploading means 103 transmits to the server computer 300 the draft data for the specification for patent application and the piece of invention report information pertaining to the draft data.

The client computer 200 is used by a person of the patent application processing department of a company or a person of a patent attorney's office requested by the company to file a patent application (hereinafter, persons will be collectively referred to as "patent-application-filing persons"), who revise the draft data for the specification for patent application, prepared by the inventor, and preparing the finalized specification data for the patent application to be filed with the Patent Office. This computer 200 comprises a draft downloading means 201, a draft revision means 202 and a draft uploading means 203.

The draft downloading means 201 reads in the draft data for the specification for patent application registered in the server computer 300.

The draft revision means 202 is used for revision, by the patent-application-filing persons, of the draft data for the specification for patent application fetched by the draft downloading means 201.

The draft uploading means 203 transmits to the server computer 300 the draft data for the specification for patent application revised by the draft revision means 202.

The server computer 300 comprises a draft receiving means 301 and a draft entry means 302. In a memory unit 310 connected to this computer 300 is stored a specification file 303, which contains a specification file management table 304.

The draft receiving means 301 receives the draft data for the specification for patent application and the piece of invention report information transmitted from the client computer 100 or 200.

The draft entry means 302 associates with each other the draft data for the specification for patent application and the piece of invention report information on the draft data received by the draft receiving means 301, and enters them into the specification file 303.

Next will be described in detail the overall operation of this embodiment with reference to FIGS. 1 to 5.

First, in the client computer 100, the draft preparation means 101 actuates, at the instruction of the inventor, text preparation software, such as a known word processor (step A1 in FIG. 2), to let the inventor use the software to prepare text data for a specification for patent application, stating the contents of the invention he or she has accomplished, and actuates known drawing software (step A2) to let the inventor use the software to prepare drawing data to be appended to the specification for patent application. After that, the inventor prepares draft data for the specification for patent application, into which the text data and the drawing data are synthesized, by using said text preparation software to insert into (paste onto) the prepared text data the drawing data. The draft preparation means 101 adds a file name designated by the inventor to the draft data, and stores them into an external memory unit 104 (step A3).

On the other hand, the invention report information entry means 102 displays an invention report information input screen for letting the inventor enter the piece of invention report information needed for reporting the invention including the reference number of the draft data for the specification for patent application (i.e. the reference number of the invention report), the name of the inventor who prepared the draft data and the title of the invention, and the file name of the draft data on a display unit (not shown), and waits for inputting of those items of information by the inventor (step A4). The reference number of the invention report here is a number assigned in accordance with a prescribed rule (e.g. a serial number assigned in the temporal order of the reporting of inventions). This number, instead of being entered by the inventor, may as well be automatically picked up by the invention report information entry means 102 and automatically piece on the invention report information input screen.

An example of the invention report information screen is shown in FIG. 3.

In the figure, this input screen 10 has input fields for entering a piece of invention report information and a file name including a reference number input field 11 for entering the reference number of draft data (the reference number of the invention report); an invention title input field 12 for entering the title of the invention on which a patent is applied for; an employee ID number input field 13 for entering the employee ID number, name, telephone numbers (extension number and line number), electronic mail address and assigned department, an inventor's name input field 14, a telephone number input field 15 and an electronic mail address input field 16, an assigned department input field 17, and a file name input field 18 for entering the file name of the draft data.

The draft uploading means 103, when a piece of invention report information on draft data and the file name of the draft data are entered onto this invention report information input screen 10, reads the draft data corresponding to the file name out of the external memory unit 104 (step A5), and transmits them, together with the piece of invention report information on the draft data, to the server computer 300 (step A6).

Then in the server computer 300, the draft receiving means 301 receives the draft data and the piece of invention report information on the draft data transmitted from the draft uploading means 103 in the client computer 100 (step A7).

The draft entry means 302 associates with each other the draft data for the specification for patent application and the piece of invention report information on the draft data received by the draft receiving means 301, and enters them into the specification file 303 (step A8).

As a specific example of entry processing at this step A8, there can be cited a method by which the draft data are stored into the specification file 303 and, at the same time, a specification file management table 304 is provided in the specification file 303 to associate their storage address and the pertinent a piece of invention report information with each other.

FIG. 4 illustrates an example of such a specification file management table 304.

Referring to FIG. 4, the table 304 consists of a plurality of entries for registering plural pieces of invention report information, and each entry consists of fields 21 to 26 in which items constituting a piece of invention report information including a reference number, the title of the invention, the inventor's name, his or her employee ID number, assigned department and telephone numbers are registered, a field 27 in which the storage address of draft data pertaining to that particular piece of invention report information in the specification file 303 is registered.

Another specific example of registration processing at step A8 is conceivable, in which a piece of invention report information and draft data are put together and stored into a single directory (file), and this file, to which a directory (file) name enabling both the inventor using the client computer 100 and the patent-application-filing persons using the client computer 200 to identify the draft data, e.g. the reference number contained in the pertinent piece of invention report information, is assigned, is registered in the specification file 303.

Upon registration of the draft data for the specification for patent application and the pertinent piece of invention report information into the server computer 300 as described above, the patent-application-filing persons are enabled to revise the draft data on the client computer 200. When the draft is to be revised, first the draft downloading means 201 of the computer 200 references the specification file management table 304 in the specification file 303 of the server computer 300; displays on a display unit (not shown) a list of all the pieces of invention report information registered in this table 304 (or only those satisfying specific conditions [e.g. only those pertaining to inventors belonging to a specific department]) (step A9); lets the patent-application-filing persons select a desired piece of invention report information; finds the storage address of the draft data pertaining to the selected piece of invention report information from the specification file management table 304; and reads the draft data from the specification file 303 on the basis of that address (step A10).

FIG. 5 illustrates a list 40 of pieces of invention report information displayed on the display unit.

As illustrated, on each line of this list 40 is displayed a piece of invention report information, and any desired piece of invention report information can be selected by entering the piece number displayed at the top (the leftmost column) of the line on which that piece of invention report information is displayed.

The draft revision means 202 actuates known text preparation software and drawing software to let the patent-application-filing persons use the software to revise the draft data for the specification for patent application fetched by the draft downloading means 201 (step A11).

After the revision is completed, the draft uploading means 203 transmits to the server computer 300 the draft data for the specification for patent application revised by the draft revision means 202, together with the piece of invention report information on the draft data (step A12).

In the server computer 300, the draft receiving means 301 receives the revised draft data for the specification for patent application and the piece of invention report information on the draft data, transmitted from the draft uploading means 203 of the computer 200 (step A13).

The draft entry means 302 stores the revised draft data for the specification for patent application, received by the draft receiving means 301, into an appropriate place. At the same time, it searches the specification file management table 304 on the basis of the piece of invention report information received by the draft receiving means 301 together with the draft data; specifies an entry in the specification file management table 304 corresponding to this piece of invention report information; updates the contents of the draft data storage address field 27 in that entry (where the storage address of the unrevised draft data for the specification for patent application is registered at present) with the storage address of the revised draft data in the file 303. This means that the unrevised draft data have been replaced by the revised draft data (step A14). Incidentally, instead of replacing the unrevised draft data with the revised draft data, the latter may as well be added to the former. In this case, a plurality of draft data storage address fields 27 in the specification file management table 304 can be provided in each entry.

As described above, this embodiment of the invention provides the benefit of enabling the client computer 100 used by an inventor preparing draft data for the specification for patent application and the client computer 200 used by patent-application-filing persons revising the draft data to prepare the specification for patent application very efficiently while transmitting and receiving the draft data via the server computer 300.

Next will be described a second preferred embodiment of the present invention in detail with reference to drawings.

Figure 6:
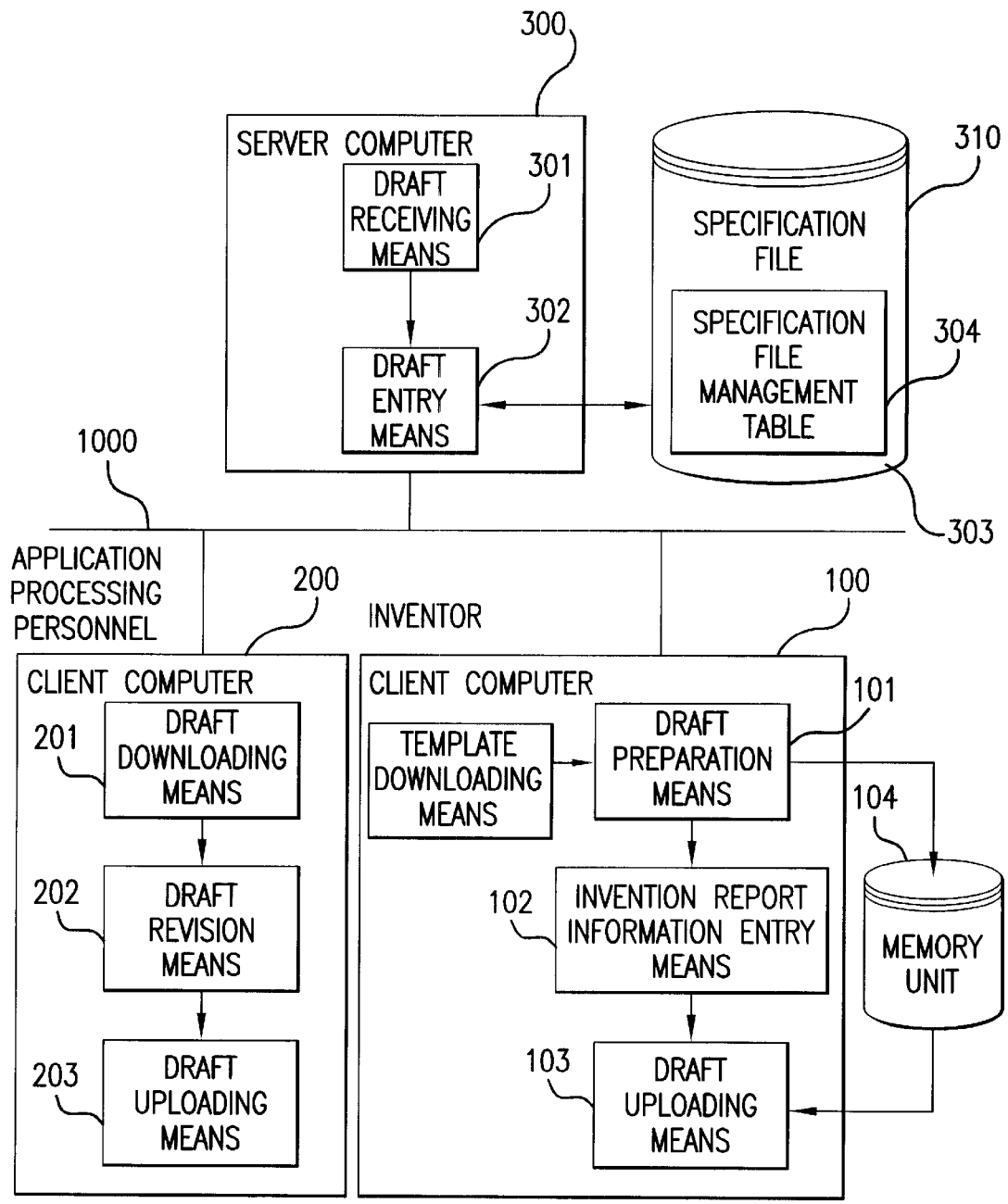
FIG. 6 is a block diagram illustrating the configuration of a second preferred embodiment of the invention.

Referring to FIG. 6, in the second preferred embodiment of the invention, the client computer 100 further includes a template downloading means 105.

This template downloading means 105 reads in document data in a specification form for patent application stored in advance in the specification file 303 of the server computer 300 (a form in which the titles of various items and sentence patterns frequently used in a specification are arranged in their respectively prescribed positions so as to allow the specification to be completed by entering sentences to fill blanks) (hereinafter called "template data").

Figure 7:
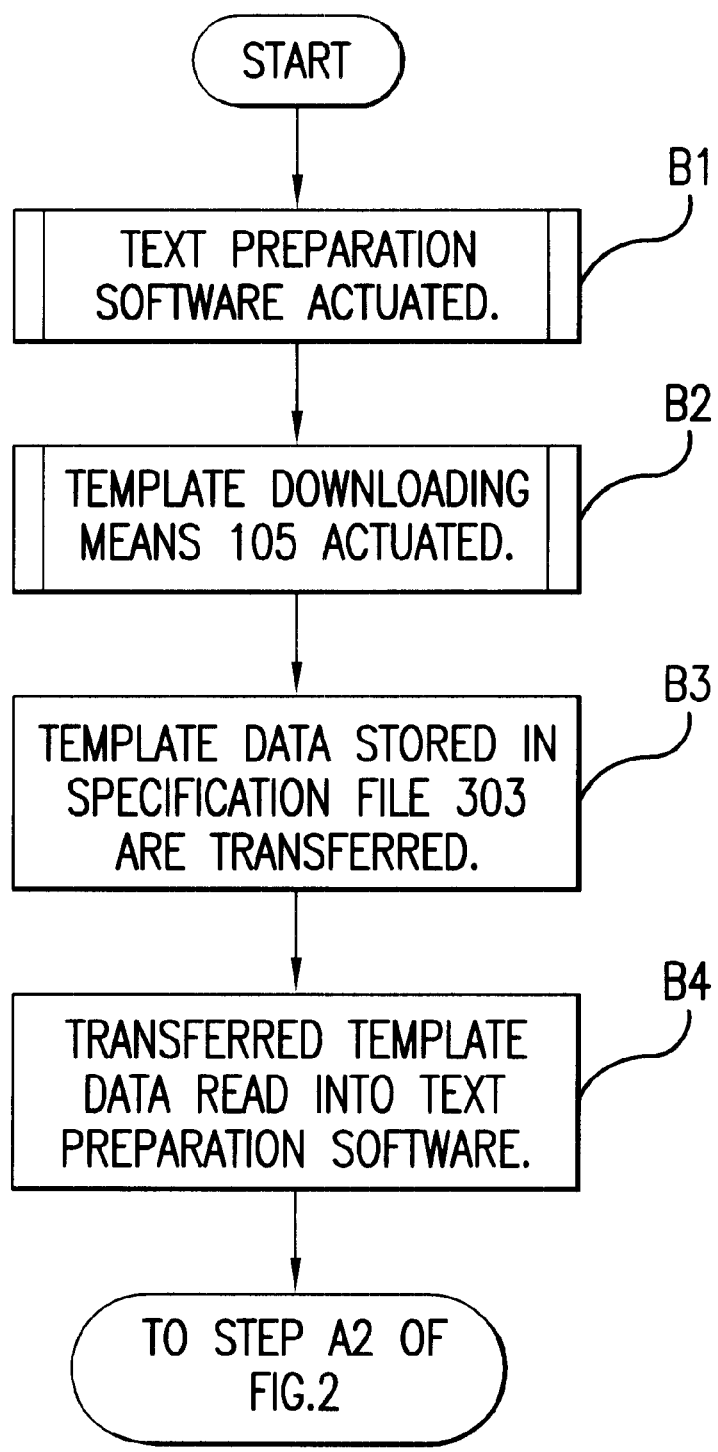
FIG. 7 is a flow chart showing a flow of operation in the second embodiment of the invention.

Next will be described in detail the overall operation of this embodiment with reference to FIGS. 6 and 7.

First, the draft preparation means 101 in the client computer 100 actuates text preparation software, such as a known word processor (step B1 in FIG. 7), and further actuates the template downloading means 105 (step B2).

The actuated template downloading means 105 reads in the template data stored in a prescribed position in the specification file 303 of the server computer 300 (step B3).

The draft preparation means 101 further reads the template data, fetched by the template down loading means 105 into the text preparation software (step B4), and completes the draft data for the specification for patent application by having the inventor enter the text data in addition to the template data.

Next, in the same manner as with the first embodiment of the invention, the draft preparation means 101 in the client computer 100 actuates known drawing software (step A2 in FIG. 2), and prepares the draft data for the specification for patent application by inserting the drawing data into the draft data.

Description of the ensuing actions, which are the same as with the first embodiment, is dispensed with here.

This embodiment of the invention provides the benefit of making ready template data, which make up a specification form for patent application, in the specification file 303 for the inventor using the client computer 100, and enabling the inventor to easily prepare a specification for patent invention.

Next will be described a third preferred embodiment of the present invention in detail with reference to drawings.

Figure 8:
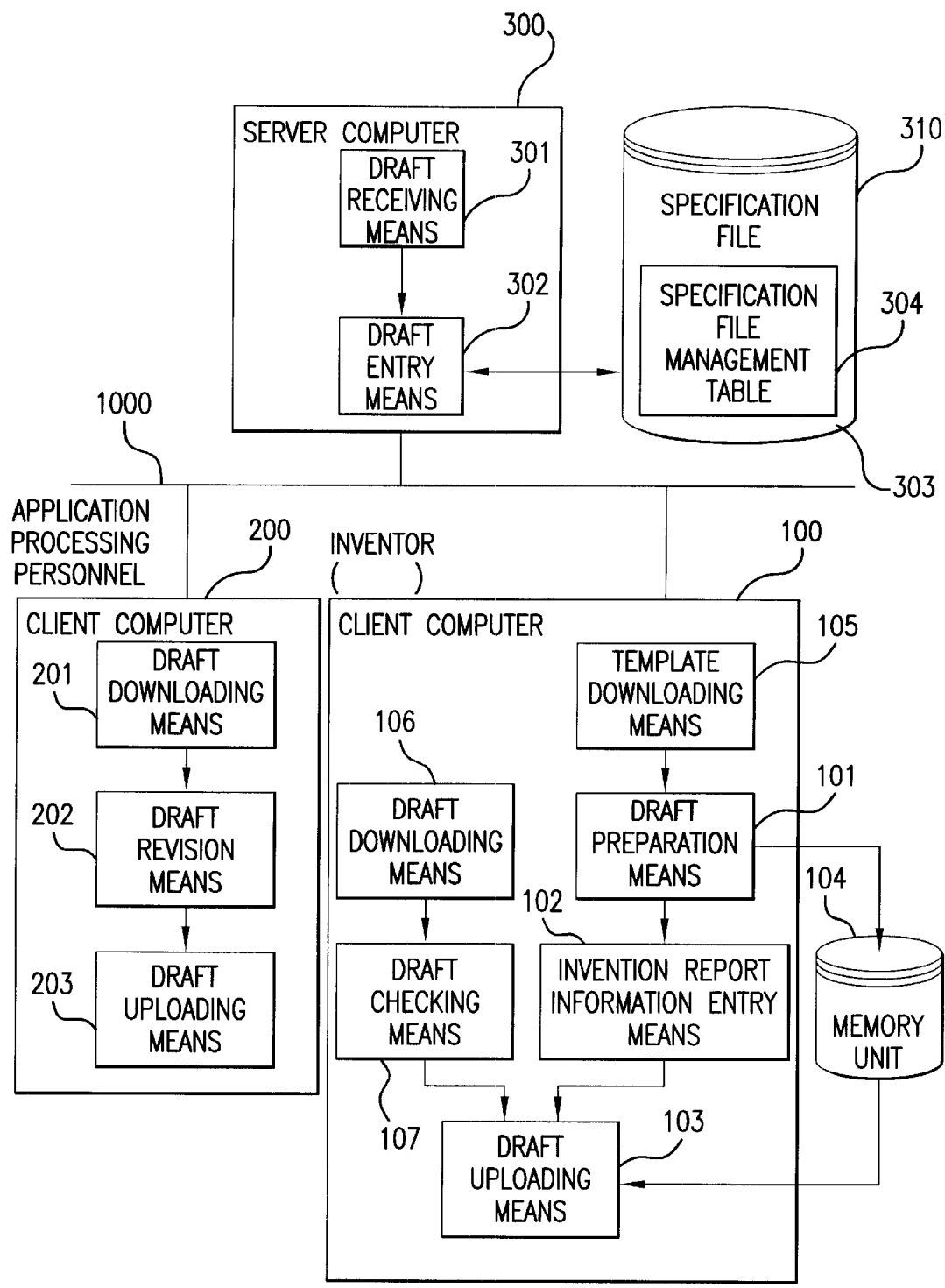
FIG. 8 is a block diagram illustrating the configuration of a third preferred embodiment of the invention.

Referring to FIG. 8, in the third preferred embodiment of the invention, the client computer 100 in the second embodiment further includes a draft downloading means 106 and a draft checking means 107.

The draft downloading means 106 reads in the draft data for the specification for patent application, revised by the patent-application-filing persons at the client computer 200 and registered in the server computer 300.

The draft checking means 107 lets the inventor check the draft data for the specification for patent application fetched by the draft downloading means 106.

Figure 9:
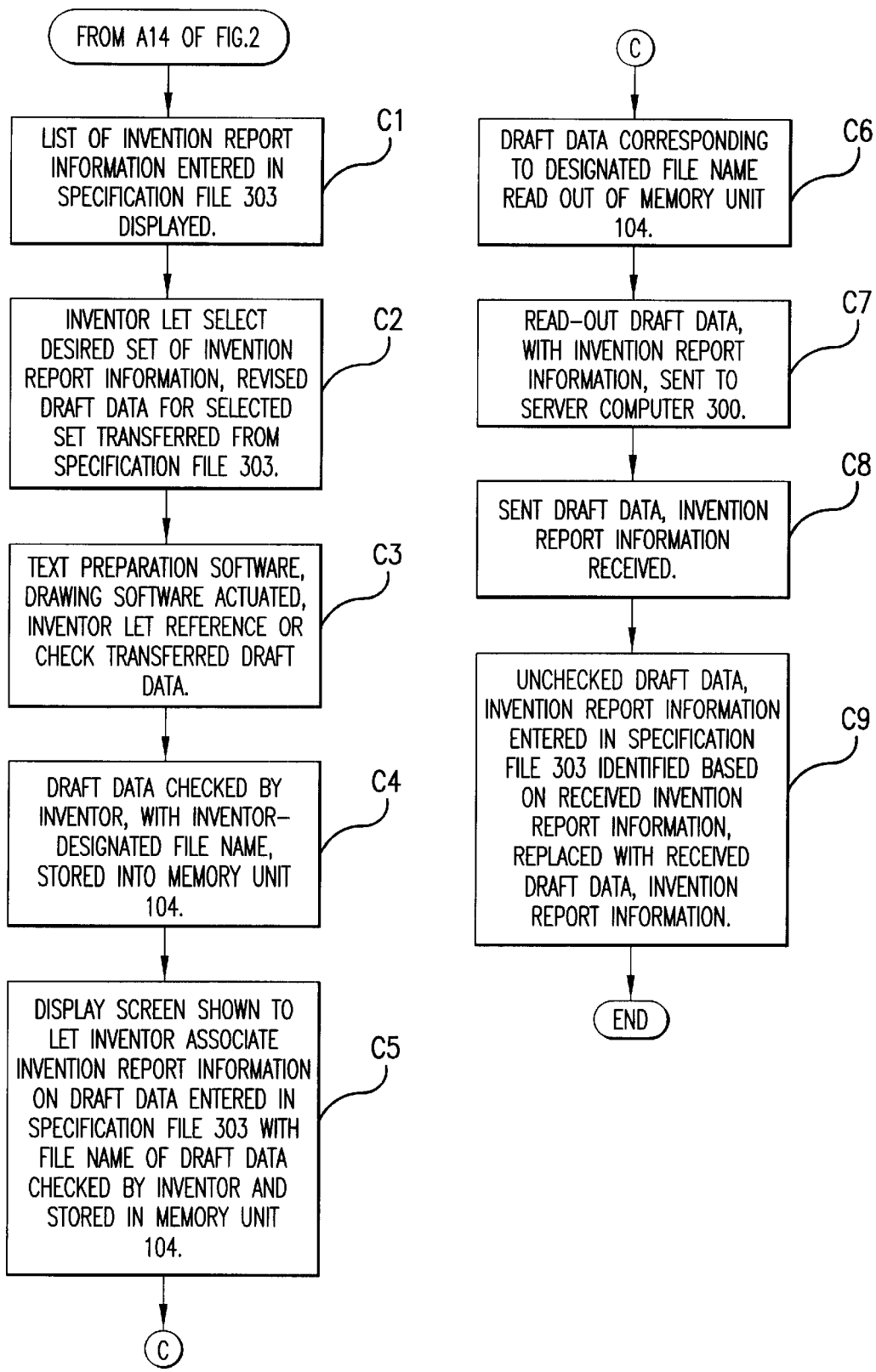
FIG. 9 is a flow chart showing a flow of operation in the third embodiment of the invention.

Next will be described in detail the overall operation of this embodiment with reference to FIGS. 8 and 9.

Incidentally, since the actions of all other constituent elements of this embodiment than the draft downloading means 106 and the draft checking means 107 are the same as the respectively corresponding elements in the first and second embodiments, their description is dispensed with except where it is specifically necessary for describing this embodiment.

After the completion of entry procedure of processing by the draft entry means 302 (step A14 in FIG. 2), the inventor checks the contents of the revised draft data thereby entered, and if he or she is to make any required correction (in this embodiment, for the sake of convenience, supplementation and/or correction done by the inventor is referred to as "checking," and those by the patent-application-filing persons, as "revision"), first the draft downloading means 106 in the client computer 100 refers to the specification file management table 304 in the specification file 303 of the server computer 300; displays on the display unit (not shown) a list of all the pieces of invention report information registered in this table 304 (or only those satisfying specific conditions [e.g. only those pertaining to the inventor concerned]) (step C1 in FIG. 9); lets the inventor select a desired piece of invention report information; finds the storage address of the draft data pertaining to the selected piece of invention report information from the specification file management table 304; and reads the revised draft data from the specification file 303 on the basis of that address (step C2). Here, the list displayed on the display unit is similar to that illustrated in FIG. 5.

The draft checking means 107 actuates text preparation software, such as a known word processor, and drawing software, and lets the inventor reference or check the revised draft data fetched by the draft downloading means 106 (step C3). The inventor, if he or she finds it necessary to modify the revised draft data, modifies the revised draft data by using the text preparation software. The draft checking means 107 adds a file name designated by the inventor to the draft data, and stores them into the memory unit 104 as checked draft data (step C4).

The draft uploading means 103 displays on the display unit a screen for letting the inventor associate the piece of invention report information pertaining to the checked draft data with the file name of the checked draft data stored in the memory unit 104 (for instance the list 40 shown in FIG. 5 supplemented with a column for entering and setting the file name) (step C5), reads out of the memory unit 104 the checked draft data corresponding to the file name so set (step C6), and transmits them to the server computer 300 together with the pertinent piece of invention report information (step C7).

Next, in the server computer 300, the draft receiving means receives the checked draft data and the piece of invention report information on the checked draft data, which have been transmitted from the draft uploading means 103 (step C8).

The draft entry means 302 of the server computer 300 stores the checked draft data received by the draft receiving means 301 into an appropriate place in the specification file 303; at the same time searches the specification file management table 304 on the basis of the piece of invention report information received by the draft receiving means 301 together with the draft data; specifies the pertinent entry in the table 304 corresponding to this piece of invention report information; updates the contents of the draft data storage address field 27 in that entry (where the storage address of the unchecked but revised draft data is stored at present)

with the storage address in the file 303 of the checked draft data, and registers them. This means that the unchecked draft data have been replaced with the checked draft data (step C9). Incidentally, as stated in the description of the first embodiment of the invention, instead of replacing the unchecked draft data with the checked draft data, the latter may as well be added to the former. In this case, a plurality of draft data storage address fields 27 in the specification file management table 304 can be provided in each entry. This disposition results in the entry of all of the draft data initially prepared by the inventor, the revised draft data resulting from the revision of the initial draft data by the patent-application-filing persons, and the checked draft data resulting from the checking of the revised draft data by the inventor.

Where the entered checked draft data are to be subsequently revised again by the patent-application-filing persons, as in the first and second embodiments, the draft downloading means 201 in the client computer 200, at the instruction of the patent-application-filing persons, reads in the checked draft data registered in the server computer 300; the draft revision means 202 causes the checked draft data, fetched by the draft downloading means 201, to be revised by the patent-application-filing persons; and the draft uploading means 203 transmits to the server computer 300 the re-revised draft data and the piece of invention report information on the re-revised draft data.

In the server computer 300, the draft receiving means 301 receives the re-revised draft data and the piece of invention report information on the re-revised draft data transmitted from the client computer 200. The draft entry means 302 stores the re-revised draft data received by the draft receiving means 301 into an appropriate place in the specification file 303; at the same time searches the specification file management table 304 on the basis of the piece of invention report information received by the draft receiving means 301 together with the draft data; specifies the entry in the table 304 corresponding to this piece of invention report information; updates the contents of the draft data storage address field 27 in that entry (where the storage address of the checked draft data yet to be re-revised is stored at present) with the storage address in the file 303 of the re-revised draft data, and registers them. This means that the draft data yet to be re-revised have been replaced with the re-revised draft data. Incidentally, as stated in the description of the first embodiment of the invention, instead of replacing the draft data yet to be re-revised with the re-revised draft data, the latter may as well be added to the former. In this case, a plurality of draft data storage address fields 27 in the specification file management table 304 can be provided in each entry. This disposition results in the entry of all of the draft data initially prepared by the inventor, the revised draft data resulting from the revision of the initial draft data by the patent-application-filing persons, the checked draft data resulting from the checking of the revised draft data by the inventor, and the re-revised draft data resulting from the re-revision of the checked draft data by the patent-application-filing persons.

In this embodiment, the inventor using the client computer 100 can fetch from the draft downloading means 106 the draft data for the specification for patent application revised by the patent-application-filing persons and entered in the specification file 303, and check them with the draft checking means 107, resulting in the benefit of enabling the inventor to check, without imposing any additional workload on the patent-application-filing persons, the draft revised by the patent-application-filing persons.

Next will be described a fourth preferred embodiment of the present invention in detail with reference to drawings.

Figure 10:
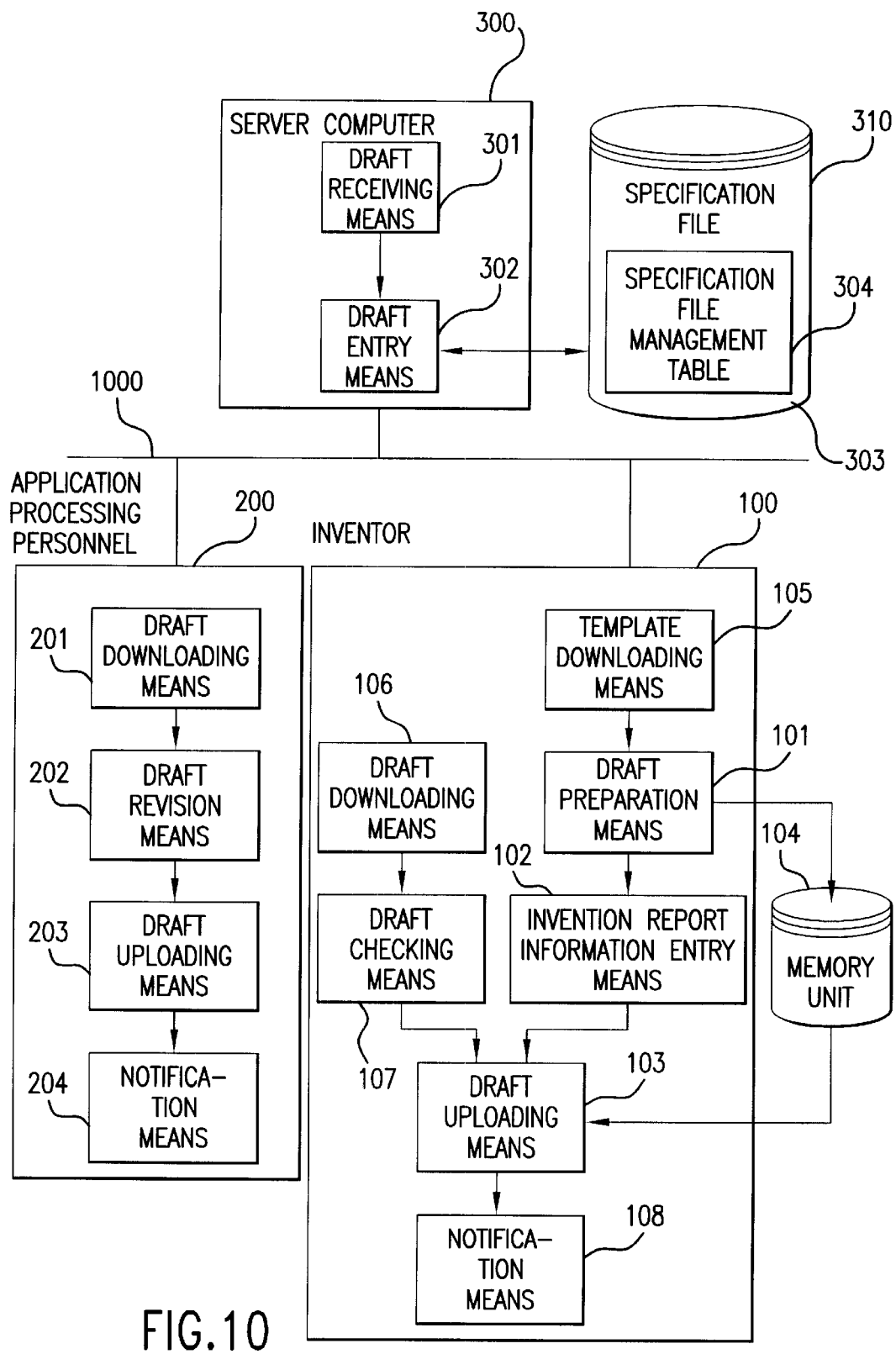
FIG. 10 is a block diagram illustrating the configuration of a fourth preferred embodiment of the invention.

Referring to FIG. 10, in the fourth preferred embodiment of the invention, the client computer 100 in the third embodiment further includes a notification means 108, and the client computer 200 further includes a notification means 204.

The notification means 108 notifies, by electronic mail, the patent-application-filing persons using the client computer 200 of the fact that the draft uploading means 103 has transmitted the draft data for the specification for patent application and the piece of invention report information on the draft data to the server computer 300.

The notification means 204 notifies, by electronic mail, the inventor using the client computer 100 of the fact that the draft uploading means 203 has transmitted the draft data for the specification for patent application and the piece of invention report information on the draft data to the server computer 300.

Next will be described in detail the overall operation of this embodiment with reference to FIGS. 10 and 11. Incidentally, since the actions of all other constituent elements of this embodiment than the notification means 108 and 204 are the same as the respectively corresponding elements in the first to third embodiments, their description is dispensed with except where it is specifically necessary for describing this embodiment.

Figure 11:
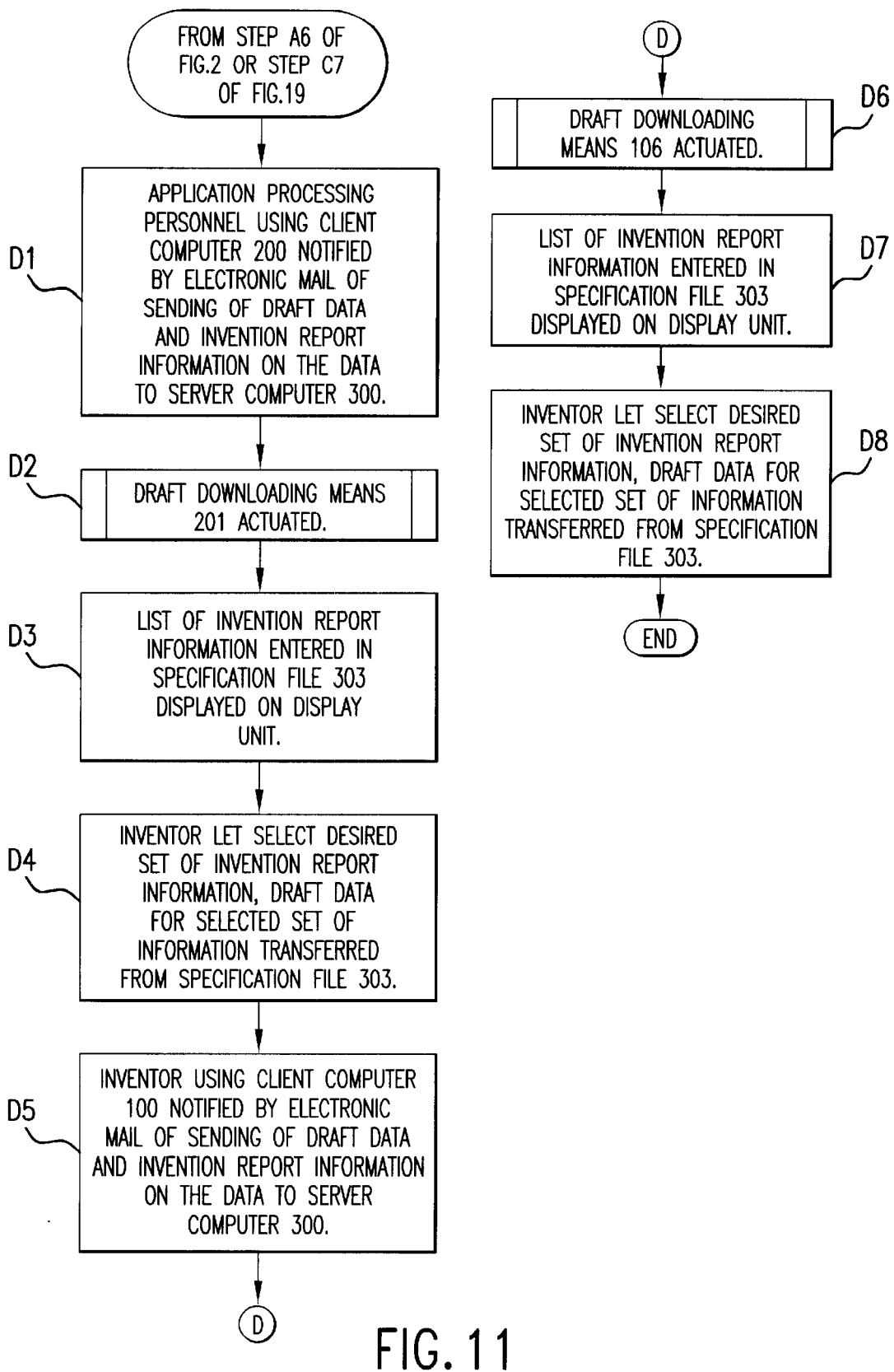
FIG. 11 is a flow chart showing a flow of operation in the fourth embodiment of the invention.

After the completion of transmission of the draft data for the specification for patent application and the piece of invention report information on the draft data to the server computer 300 by the draft uploading means 103 of the client computer 100 (step A6 in FIG. 2 or step C7 in FIG. 9), the notification means 108 notifies, by electronic mail, the patent-application-filing persons using the client computer 200 of the fact that the draft data and the piece of invention report information on the draft data have been transmitted to the server computer 300 (step D1 in FIG. 11).

In the client computer 200, when the patent-application-filing persons receives an electronic mail to the effect that the draft data and the piece of invention report information on the draft data from the notification means 108 of the client computer 100 have been transmitted to the server computer 300, the draft downloading means 201 is actuated at the instruction of the patent-application-filing persons as in the first to third embodiments (step D2); the actuated downloading means 201 displays on the display unit (not shown) a list of the pieces of invention report information registered in the specification file 303 of the server computer 300 (step D3), lets the patent-application-filing persons select the piece of invention report information notified of by electronic mail, and reads in the draft data pertaining to the selected piece of invention report information from the specification file 303 (step D4).

After that, as the draft data are revised with the draft revision means 202 and the draft uploading means 203 transmits the revised draft data to the server computer 300 together with the piece of invention report information on the draft data, the notification means 204 notifies by electronic mail the inventor using the client computer 100 of the fact that the draft uploading means 203 has transmitted the revised draft data and the piece of invention report information on the draft data to the server computer 300 (step D5).

In the client computer 100, when the inventor receives an electronic mail to the effect that the draft data and the piece of invention report information on the draft data from the notification means 204 of the client computer 200 have been transmitted to the server computer 300, the draft downloading means 106 is actuated at the instruction of the inventor (step D6); the actuated draft downloading means 106 displays on the display unit (not shown) a list of the pieces of invention report information registered in the specification file 303 of the server computer 300 (step D7), lets the inventor select the piece of invention report information notified of by electronic mail, and reads in the draft data pertaining to the selected piece of invention report information from the specification file 303 (step D8).

Thereafter, where the revised draft data are to be subsequently checked, as in the first to third embodiments, the draft checking means 107 in the client computer 100 lets the inventor check the revised draft data fetched by the draft downloading means 106, and the draft uploading means 103 transmits the draft data, checked by the inventor and the piece of invention report information on the draft data, to the server computer 300.

This embodiment of the invention provides the benefit of enabling the patent-application-filing persons to promptly perceive the entry of the draft data to be revised into the specification file 303 without having to regularly check the specification file 303, because the inventor using the client computer 100 can notify, by electronic mail with the notifying means 108, the patent-application-filing persons using the client computer 200 of the fact that the draft data for the specification for patent application and the piece of invention report information on the draft data have been transmitted to the server computer 300.

This embodiment of the invention provides the further benefit of enabling the inventor to promptly perceive the entry of the revised draft data into the specification file 303 without having to regularly check the specification file 303, because the patent-application-filing persons using the client computer 200 can notify, by electronic mail with the notifying means 204, the inventor using the client computer 100 of the fact that the revised draft data for the specification for patent application and the piece of invention report information on the draft data have been transmitted to the server computer 300.

Next will be described a fifth preferred embodiment of the present invention in detail with reference to drawings.

Figure 12:
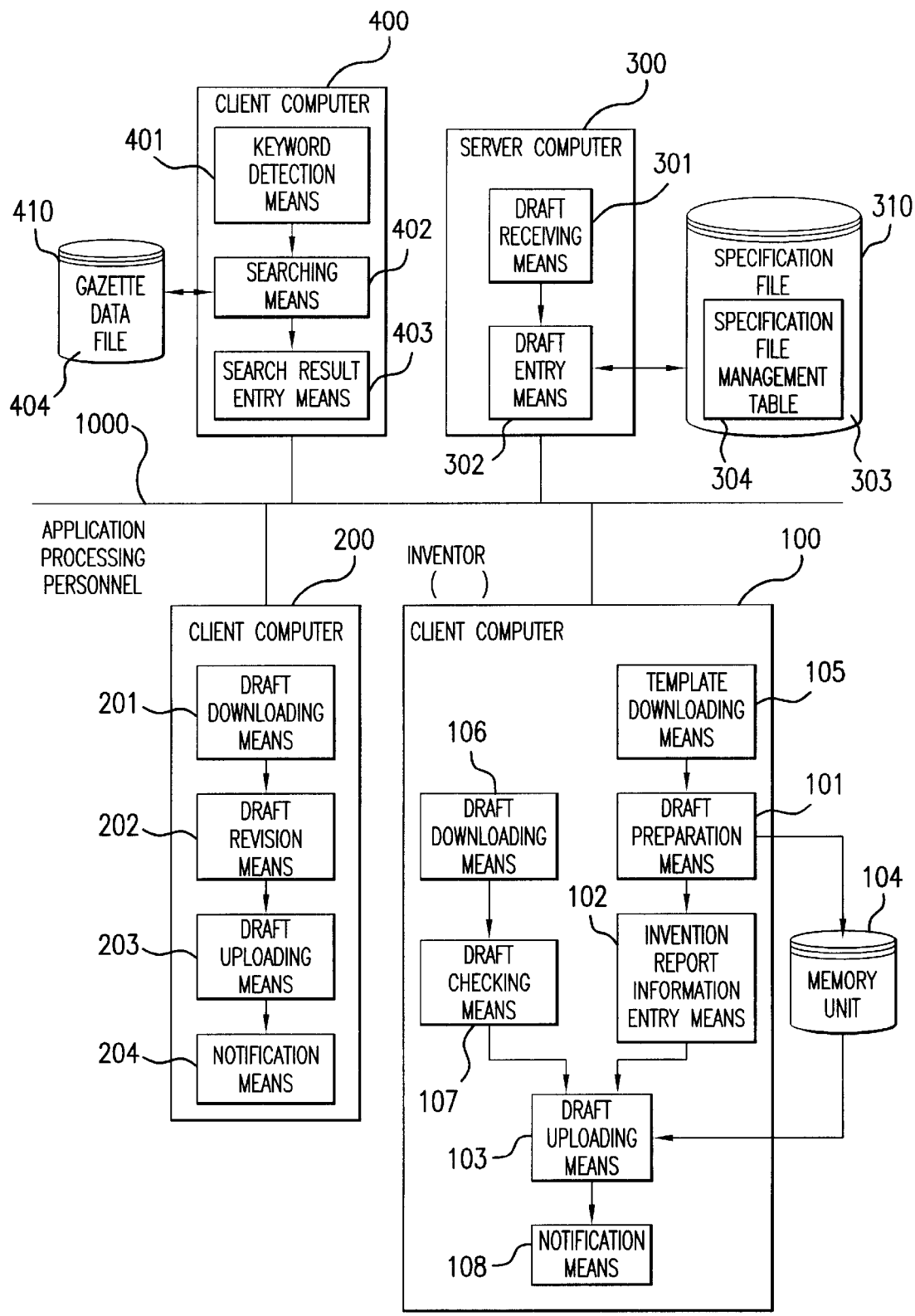
FIG. 12 is a block diagram illustrating the configuration of a fifth preferred embodiment of the invention.

Referring to FIG. 12, the fifth preferred embodiment of the invention includes, in addition to the configuration of the fourth embodiment, a client computer 400 operating under programmed control and a memory unit 410 connected to this computer 400.

The client computer 400 comprises a keyword detection means 401, a searching means 402 and a search result entry means 403. In the memory unit 410 is stored a gazette data file 404.

The keyword detection means 401 detects a keyword for searching prior art out of draft data for specifications for patent applications registered in the specification file 303 of the server computer 300.

The searching means 402 searches the gazette data file 404 on the basis of the keyword detected by the keyword detection means 401, and reads out pertinent gazette data.

The search result entry means 403 enters the gazette data read out by the searching means 402 into the specification file 303 of the server computer 300.

The gazette data file 404 stores gazette data including the publications of laid-open patents and those of published patents issued by the Patent Office in the past.

Next will be described in detail the overall operation of this embodiment with reference to FIGS. 12 to 14. Incidentally, since the actions of all other constituent elements of this embodiment than the client computer 400 and the memory unit 410 are the same as the respectively corresponding elements in the first to fourth embodiments, their description is dispensed with except where it is specifically necessary for describing this embodiment.

Figure 13:
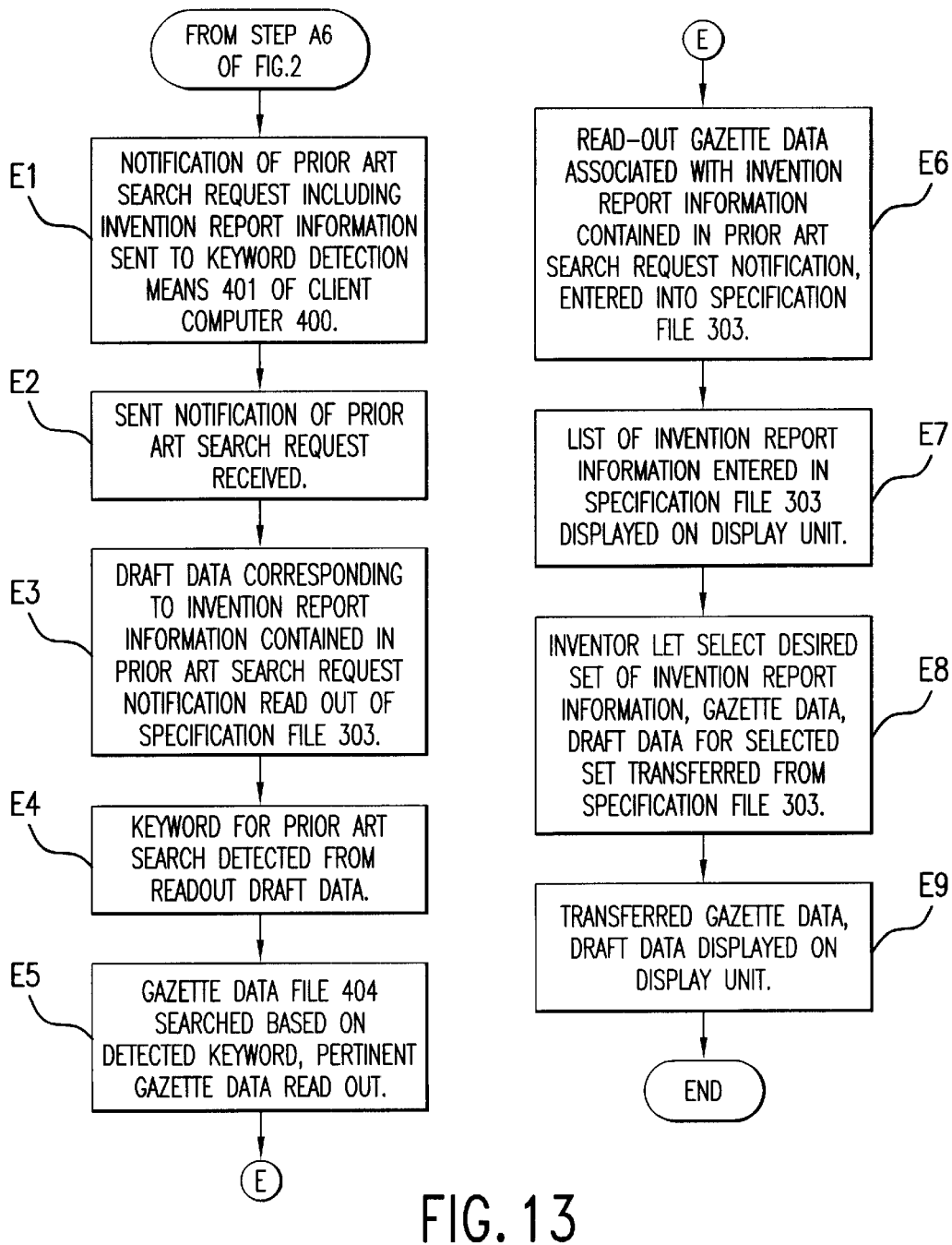
FIG. 13 is a flow chart showing a flow of operation in the fifth embodiment of the invention.

After the completion of transmission of the draft data for the specification for patent application and the piece of invention report information on the draft data to the server computer 300 by the draft uploading means 103 of the client computer 100 (step A6 in FIG. 2), the computer 100 or 300 transmits a notification of request for prior art searching, including the piece of invention report information, to the keyword detection means 401 of the client computer 400 (step E1 in FIG. 13).

The keyword detection means 401 of the client computer 400, upon receiving the notification of request for prior art searching from the computer 100 or 300 (step E2), reads out draft data for the specification for patent application corresponding to the piece of invention report information contained in the notification of request for prior art searching (step E3), and detects the keyword for prior art searching out of the draft data (step E4).

Next, the searching means 402 searches the gazette data file 404 on the basis of the keyword detected by the keyword detection means 401, and reads out the pertinent gazette data (step E5).

The search result entry means 403 associates the gazette data, read out by the searching means 402, with the piece of invention report information contained notification of request for prior art searching received at step E2, and enters them into the specification file 303 of the server computer 300 (step E6). Thus it stores the gazette data in an appropriate place in the specification file 303, and at the same time enters their storage address in the pertinent gazette data storage address field 28 of a specification file management table 304 illustrated in FIG. 14 (similar to the table 304 shown in FIG. 4 except that a gazette data storage address field 28 is provided).

As the gazette data are entered into the server computer 300 as described above, first the draft downloading means 201 in the client computer 200 references the specification file management table 304 in the specification file 303 of the server computer 300; displays on a display unit (not shown) a list of all the pieces of invention report information registered in this table 304 (or only those satisfying specific conditions [e.g. only those pertaining to inventors belonging to a specific department]) (step E7); lets the patent-application-filing persons select a desired piece of invention report information; finds the storage address of the draft data pertaining to the selected piece of invention report information and the gazette data from the specification file management table 304; reads the draft data and the gazette data from the specification file 303 on the basis of that address (step E8); and displays them on the display unit (step E9).

The patent-application-filing persons reference the gazette data and the draft data for the specification for patent application displayed on the display unit by the draft downloading means 201, and actuate the draft revision means 202 to revise the draft data so as to make the contents of the draft data (the contents of the invention) novel and unobvious.

After that, as in the first to fourth embodiments, the actuated draft revision means 202 causes the draft data to be revised by the patent-application-filing persons, and the draft uploading means 203 transmits to the server computer 300 the revised draft data for the specification for patent application and the piece of invention report information on the draft data. In the server computer 300, the draft receiving means 301 receives the revised draft data for the specification for patent application and the piece of invention report information on the draft data transmitted from the client computer 200, and the draft entry means 302 enters the revised draft data for the specification for patent application and the piece of invention report information on the draft data into the specification file 303.

If the patent-application-filing persons, having referenced the gazette data and the draft data for the specification for patent application, judge that the contents of the draft data are neither novel nor unobvious, and notify the inventor using the client computer 100, by electronic mail with the notifying means 204, of a decision not to file an application for the pertinent piece of invention report information.

In this embodiment of the invention, the keyword detection means 401 of the client computer 400 detects a keyword for prior art searching out of the draft data for the specification for patent application entered in the specification file 303; the searching means 402 reads out the pertinent gazette data out of the gazette data file 404 on the basis of the keyword; and the search result entry means 403 enters the read-out gazette data into the specification file 303, so that the patent-application-filing persons using the client computer 200 can revise the draft data entered in the specification file 303 with the draft revision means 202 to have the contents of the gazette reflected on the revision while referencing the gazette data, resulting in the benefit that a specification for patent application of high quality can be prepared very efficiently.

Next will be described a sixth preferred embodiment of the present invention in detail with reference to drawings.

Figure 15:
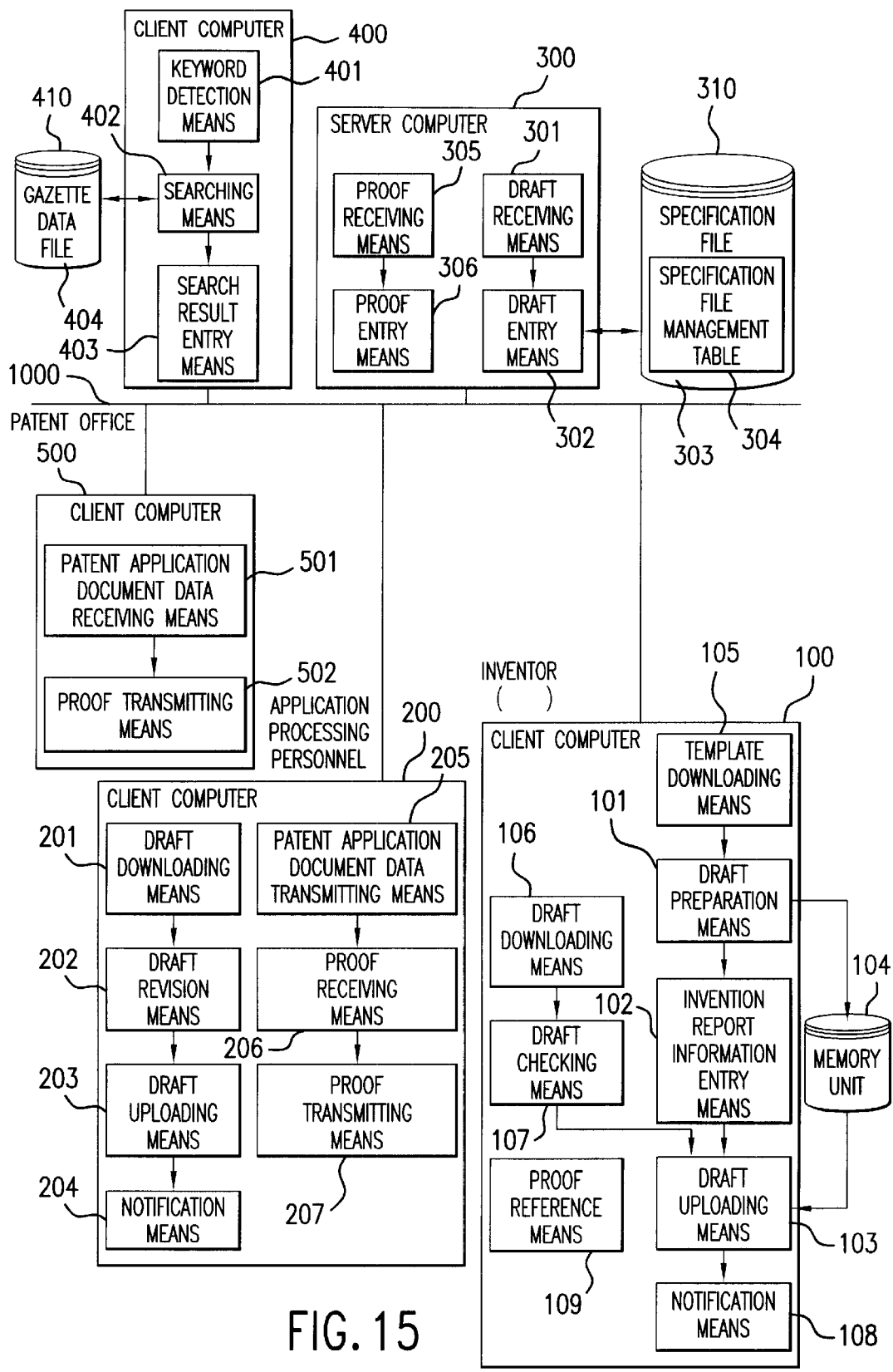
FIG. 15 is a block diagram illustrating the configuration of a sixth preferred embodiment of the invention.

Referring to FIG. 15, the sixth preferred embodiment of the invention includes, in addition to the configuration of the fifth embodiment, a client computer 500, and the client computer 200 includes a patent application document data transmitting means 205, a proof receiving means 206 and a proof transmitting means 207, while the server computer 300 includes a proof receiving means 305 and a proof entry means 306.

The client computer 500, to be used by the Patent Office, comprises a patent application document data receiving means 501 and a proof transmitting means 502.

The patent application document data receiving means 501 receives patent application document data transmitted from the client computer 200.

The proof transmitting means 502 prepares a proof corresponding to the patent application document data received by the patent application document data receiving means 501, and transmits it to the client computer 200.

The client computer 200 further includes the patent application document data transmitting means 205, the proof receiving means 206 and the proof transmitting means 207.

The patent application data transmitting means 205 receives the draft data for the specification for patent application and the piece of invention report information on the draft data, transmitted from the draft uploading means 203, to the server computer 300, prepares patent application document data, and transmits them to the client computer 500.

The proof receiving means 206 receives the proof transmitted from the client computer 500.

The proof transmitting means 207 transmits to the server computer 300 the proof received by the proof receiving means 206.

The server computer 300 further includes the proof receiving means 305 and the proof entry means 306.

The proof receiving means 305 receives the proof transmitted from the client computer 200.

The proof entry means 306 enters into the specification file 303 the proof received by the proof receiving means 305.

The client computer 100 further includes a proof reference means 109.

The proof reference means 109 displays the proof registered in the specification file 303 on a display unit (not shown).

Next will be described in detail the overall operation of this embodiment with reference to FIGS. 15 to 17. Incidentally, since the actions of all other constituent elements of this embodiment than the client computer 500, the patent application document data transmitting means 205, the proof receiving means 206, the proof transmitting means 207, the proof receiving means 305 and the proof entry means 306 are the same as the respectively corresponding elements in the first to fifth embodiments, their description is dispensed with except where it is specifically necessary for describing this embodiment.

Figure 16:
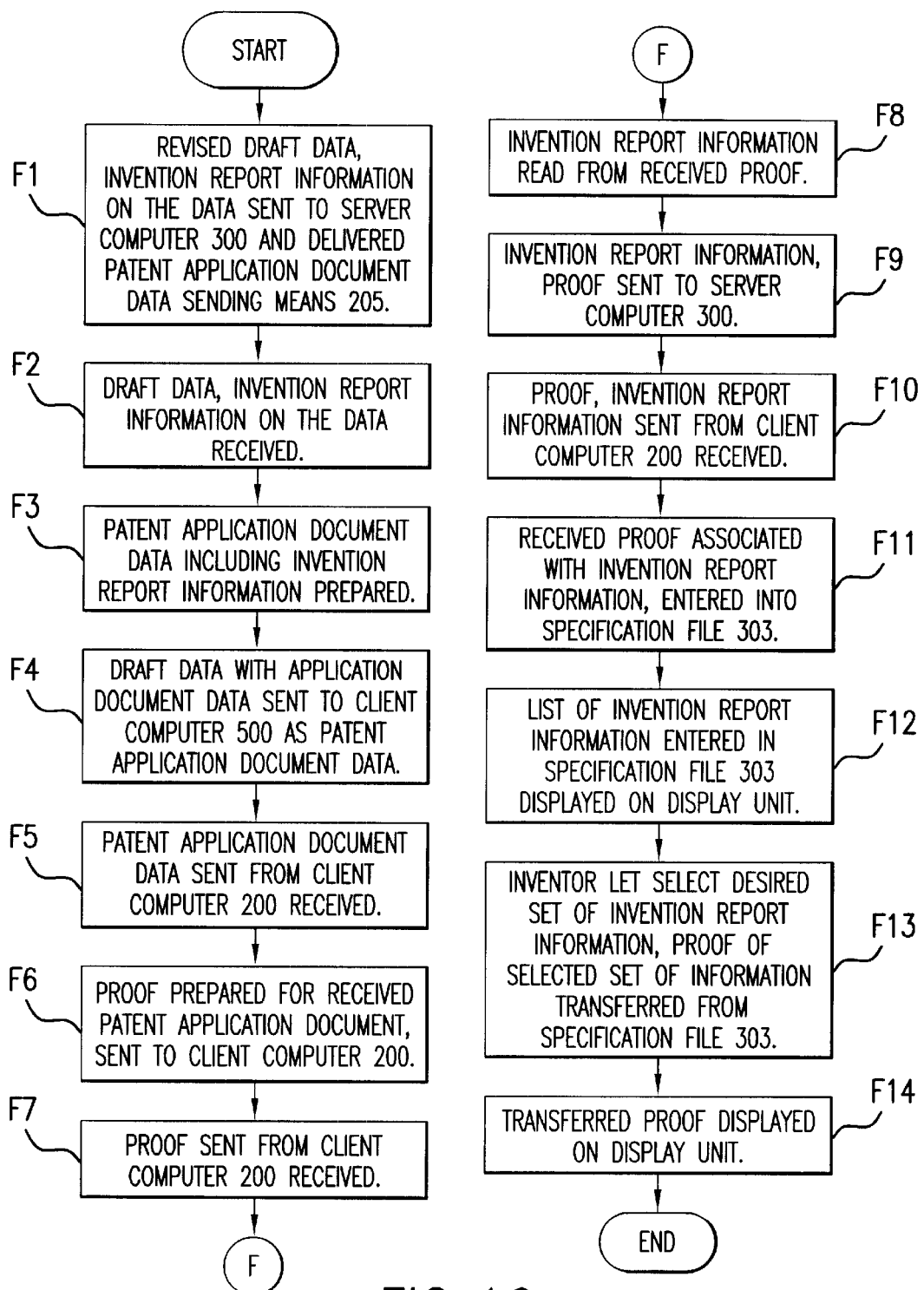
FIG. 16 is a flow chart showing a flow of operation in the sixth embodiment of the invention.

Upon completion of final revision of the draft data by the patent-application-filing persons, the draft uploading means 203 of the client computer 200 transmits the draft data and the piece of invention report information on the draft data to the server computer 300 and, at the same time, delivers the draft data and the piece of invention report information on the draft data to the to the patent application document data transmitting means 205 (step F1 in FIG. 16).

The patent application document data transmitting means 205 receives from the draft uploading means 203 the draft data and the piece of invention report information on the draft data (step F2), extracts from the piece of invention report information items necessary for the preparation of a patent application (including the inventor's name and the title of the invention) to prepare document data for the patent application (step F3), and transmits the draft data for the specification for patent application, accompanied with the document data on the application, to the client computer 500 as patent application document data (step F4).

Next, in the client computer 500, the patent application document data receiving means 501 receives the patent application document data transmitted from the client computer 200 (step F5).

The proof transmitting means 502 prepares a proof corresponding to the patent application document data received by the patent application document data receiving means 501, and transmits it to the client computer 200 (step F6).

In the client computer 200, the proof transmitting means 206 receives the proof transmitted from the client computer 500 (step F7).

The proof transmitting means 207 reads from the proof, received by the proof receiving means 206, items related to the piece of invention report information (including the reference number, the inventor's name and the title of the invention) and application information including the application number and the application date (step F8), and transmits the items related to the piece of invention report information, the application information and the proof to the server computer 300 (step F9).

The proof receiving means 305 of the server computer 300 receives the proof, the items related to the piece of invention report information and the application information transmitted from the client computer 200 (step F10).

The proof entry means 306 associates the proof and the application information, received by the proof receiving means 305, with each other on the basis of the items related to the piece of invention report information, and enters them into the specification file 303 (step F11). Thus, it stores the proof in an appropriate place in the specification file 303, and at the same time enters its storage address into the proof storage address field 29 of the pertinent entry (i.e. identified by an item related to the piece of invention report information [e.g. the reference number]) of a specification file management table 304 illustrated in FIG. 17 (similar to the table 304 shown in FIG. 14 except that a proof storage address field 29, an application number field 30 and an application date field 31 are provided). It further enters the application number and the application date into the application number field 30 and the application date field 31, respectively, of this field.

When the inventor desires to confirm the contents of the proof, the proof reference means 109 of the client computer 100, at his or her instruction, displays on a display unit (not shown) a list of the pieces of invention report information (a list similar to that shown in FIG. 9 augmented with application numbers and application dates) registered in the specification file 303 (step F12); lets the inventor select a desired piece of invention report information; reads in the proof pertaining to the selected piece of invention report information from the specification file 303 (step F13); and displays the proof, that has been fetched, on the display unit (step F14).

Next will be described a seventh preferred embodiment of the present invention in detail with reference to drawings.

Figure 18:
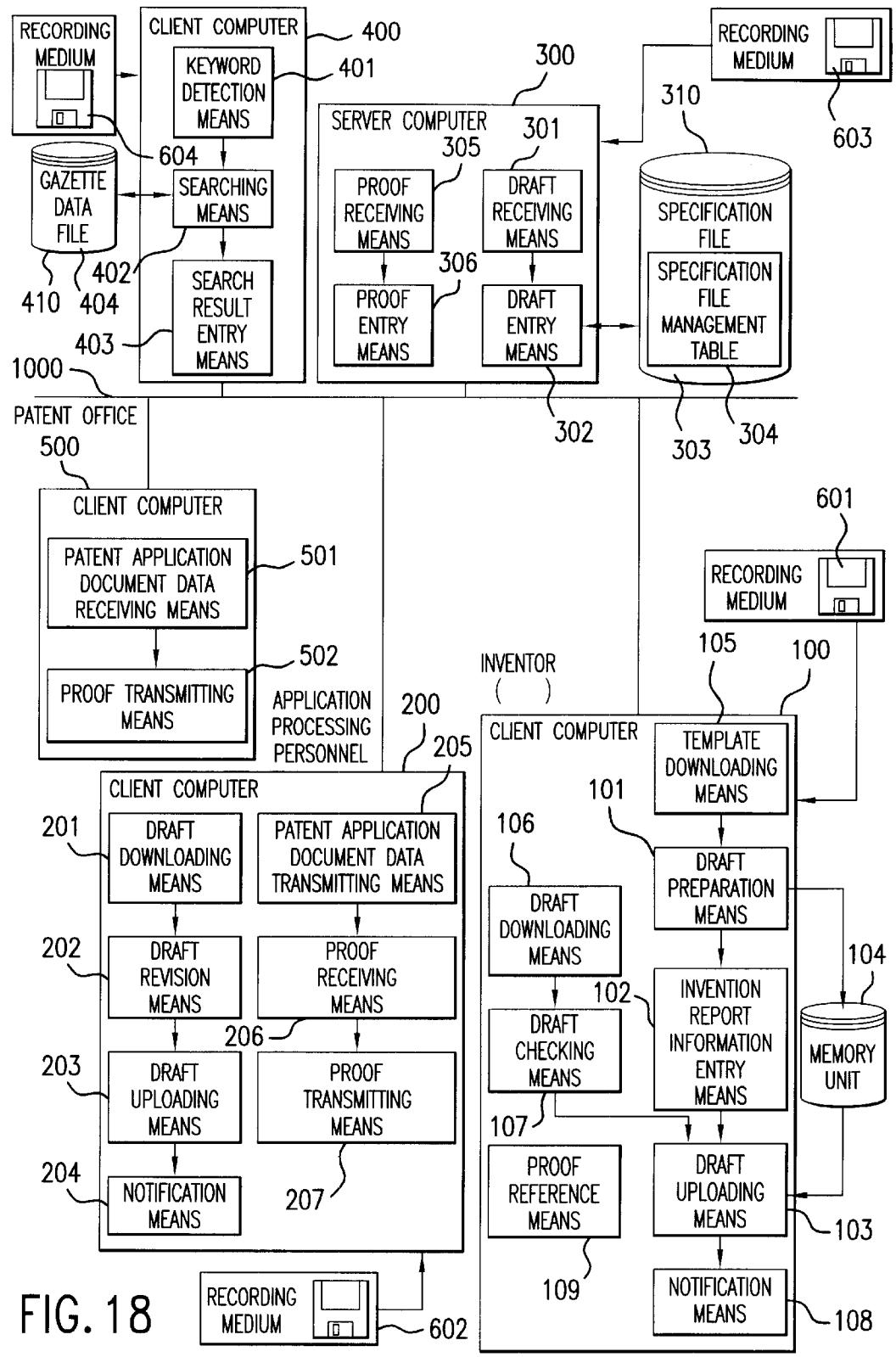
FIG. 18 is a block diagram illustrating the configuration of a seventh preferred embodiment of the invention.

Referring to FIG. 18, the seventh preferred embodiment of the invention comprises recording media 601 to 605 recording thereon programs for the preparation of specifications for patent application. These recording media 601 to 605 may be magnetic disks, semiconductor memories or some other types of recording media.

An inventor's program for the preparation of specifications for patent application is read from the recording medium 601 into the client computer 100 via a signal line, and controls the operation of the client computer 100. The client computer 100, under the control of the inventor's program for the preparation of specifications for patent application, executes the same procedures of processing as those by the draft preparation means 101, the invention report information entry means 102, the draft uploading means 106, the draft checking means 107, the notification means 108 and the proof reference means 109 in the client computer 100 in any of the first to sixth embodiments of the invention.

An patent-application-filing persons' program for the preparation of specifications for patent application is read from the recording medium 602 into the client computer 200 via a signal line, and controls the operation of the client computer 200. The client computer 200, under the control of the patent-application-filing persons' program for the preparation of specifications for patent application, executes the same procedures of processing as those by the draft downloading means 201, the draft revision means 202, the draft uploading means 203, the notification means 204, the patent application document data transmitting means 205, the proof receiving means 206 and the proof transmitting means 207 in the client computer 200 in any of the first to sixth embodiments of the invention.

An entry management program is read from the recording medium 603 into the server computer 300 via a signal line, and controls the operation of the server computer 300. The server computer 300, under the control of the entry management program, executes the same procedures of processing as those by the draft receiving means 301, the draft entry means 302, the proof receiving means 305 and the proof entry means 306 in the server computer 300 in any of the first to sixth embodiments of the invention.

A prior art searching program is read from the recording medium 604 into the client computer 400 via a signal line, and controls the operation of the client computer 400. The client computer 400, under the control of the prior art searching program, executes the same procedures of processing as those by the keyword detection means 401, the searching means 402 and the search result entry means 403 in the client computer 400 in either of the fifth and sixth embodiments of the invention.

As hitherto described, the present invention provides the benefit of enabling a client computer used by an inventor to prepare and check draft data and another client computer used by patent-application-filing persons to revise the draft data to prepare specifications for patent applications very efficiently while transmitting and receiving the draft data between each other via a server computer.

Although the invention has been described in detail above in connection with various preferred embodiments thereof, it will be appreciated by those skilled in the art that these embodiments have been provided solely for the purpose of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A system for preparing patent specifications comprising a first computer, a second computer, a third computer and a communication network connecting said first computer, said second computer and said third computer, said system comprising:

said first computer including a draft preparation means for entering patent specification draft data of a patent specification prepared by an inventor, a draft uploading means for transmitting to said second computer respective patent specification draft data entered from said draft specification preparation means and a piece of invention report information for identifying the respective patent specification draft data, and a notification means for addressing an upload notification of said patent specification draft data to a patent-application-filing person;

said second computer including a specification file memory means, and a draft entry means for entering respective patent specification draft data and said piece of invention report information for identifying the respective draft data, transmitted from said first and third computers into said specification memory means, with the respective draft data and the pieces of invention report information being associated with each other; and said third computer including a draft downloading means for fetching from said second computer patent specification draft data corresponding to a piece of invention report information designated by a patent-applicationfiling person, a draft revision means for revising the draft data fetched by the draft downloading means in accordance with an instruction by said patent-application-filing person, and a revised draft uploading means for transmitting to said second computer the draft data revised by said draft revision means and the piece of invention report information designated by said patent-application-filing person.

2. A system for preparing patent specifications comprising a first computer, a second computer, a third computer and a communication network connecting said first computer, said second computer and said third computer, said system comprising:

said first computer including a draft preparation means for entering patent specification draft data of a patent specification prepared by an inventor, a draft uploading means for transmitting to said second computer respective patent specification draft data entered from said draft specification preparation means and a piece of invention report information for identifying the respective patent specification draft data;

said second computer including a specification file memory means, and a draft entry means for entering respective patent specification draft data and said piece of invention report information for identifying the respective draft data, transmitted from said first and third computers into said specification memory means, with the respective draft data and the pieces of invention report information being associated with each other; and said third computer including a draft downloading means for fetching from said second computer patent specification draft data corresponding to a piece of invention report information designated by a patent-application-filing person, a draft revision means for revising the draft data fetched by the draft downloading means in accordance with an instruction by said patent-application-filing person, and a revised draft uploading means for transmitting to said second computer the draft data revised by said draft revision means and the piece of invention report information designated by said patent-application-filing person;

a patent application document sending means for sending an application form and said revised draft data for filing with the United States Patent and Trademark Office as patent application document data to a computer of the United States Patent and Trademark Office; and a proof sending means for receiving proof data, corresponding to said patent application document data, sent from the computer of the United States Patent and Trademark Office in response to said patent application document data, and sending the proof data, associated with the piece of invention report information corresponding to the proof data, to said second computer to enter the proof data into said specification file memory means.

3. A system for preparing patent specifications comprising a first computer, a second computer, a third computer and a communication network connecting said first computer, said second computer and said third computer, said system comprising:

said first computer including a draft preparation means for entering patent specification draft data of a patent specification prepared by an inventor, a draft uploading means for transmitting to said second computer respective patent specification draft data entered from said draft specification preparation means and a piece of invention report information for identifying the respective patent specification draft data, a first draft downloading means for fetching from said second computer draft data corresponding to a piece of invention report information designated by said inventor, a draft amending means for amending the draft data fetched by the first draft downloading means in accordance with an instruction by said inventor, and an amended draft uploading means for transmitting to said second computer the draft data amended by the draft amending means and the piece of invention report information designated by said inventor;

said second computer including a specification file memory means, and a draft entry means for entering respective patent specification draft data and said piece of invention report information for identifying the respective draft data, transmitted from said first and third computers into said specification memory means, with the respective draft data and the pieces of invention report information being associated with each other; and said third computer including a second draft downloading means for fetching from said second computer patent specification draft data corresponding to a piece of invention report information designated by a patent-application-filing person, a draft revision means for revising the draft data fetched by the second draft downloading means in accordance with an instruction by said patent-application-filing person, and a revised draft uploading means for transmitting to said second computer the draft data revised by said draft revision means and the piece of invention report information designated by said patent-application-filing person a patent application document sending means for sending an application form and said revised draft data for filing with the United States Patent and Trademark Office as patent application document data to a computer of the United States Patent and Trademark Office; and a proof sending means for receiving proof data, corresponding to said patent application document data, sent from the computer of the United States Patent and Trademark Office in response to said patent application document data, and sending the proof data, associated with the piece of invention report information corresponding to the proof data, to said second computer to enter the proof data into said specification file memory means.

4. A system for preparing patent specifications comprising a first computer, a second computer, a third computer, a fourth computer, and a communications network connecting said first computer, said second computer, said third computer and said fourth computer, said system comprising:

said first computer including a draft preparation means for entering patent specification draft data of a patent specification prepared by an inventor, a draft uploading means for transmitting to said second computer respective patent specification draft data entered from said draft specification preparation means and a piece of invention report information for identifying the respective patent specification draft data;

said second computer including a specification file memory means, and a draft entry means for entering respective patent specification draft data and said piece of invention report information for identifying the respective draft data, transmitted from said first and fourth computers into said specification memory means, with the respective draft data and the pieces of invention report information being associated with each other;

said third computer including an entry means for referencing, when patent specification draft data are transmitted from said first computer to said second computer, the patent specification draft data, searching a prior art reference database for reference data on the basis of the contents of the invention indicated by the patent specification draft data, associating searched reference data with the patent specification draft data and entering them into said specification file memory means; and said fourth computer including a draft downloading means for fetching from said second computer patent specification draft data corresponding to a piece of invention report information designated by a patent-application-filing person and reference data related thereto, a draft revision means for revising the draft data fetched by the draft downloading means in accordance with an instruction by said patent-application-filing person having referenced to the related reference data fetched together with the draft data, and a revised draft uploading means for transmitting to said second computer the draft data revised by said draft revision means and the piece of invention report information designated by said patent-application-filing person.

5. A method for preparing patent specifications including:

a draft preparation step for a first computer to enter patent specification draft data for a patent specification prepared by an inventor;

a draft uploading step for said first computer to transmit to a second computer respective patent specification draft data entered at said draft preparation step and a piece of invention report information for identifying the respective patent specification draft data;

a notification step for said first computer to address an upload notification on said patent specification draft data, entered at said draft preparation step, to patent-application-filing person;

a draft entry step for said second computer to enter respective patent specification draft data and said piece of invention report information for identifying the respective draft data, transmitted from said first computer, the data and the information being associated with each other, into a specification file memory means;

a draft downloading step for a third computer to fetch from said second computer patent specification draft data corresponding to a piece of invention report information designated by a patent-application-filing person;

a draft revision step for said third computer to revise the draft data fetched at said draft downloading step in accordance with an instruction by said patent-application-filing person;

a revised draft uploading step for said third computer to transmit to said second computer the draft data revised at said draft revision step and the piece of invention report information designated by said patent-application-filing person; and a revised draft entry step for said second computer to enter respective patent specification draft data and said piece of invention report information transmitted from said third computer, the data and the information being associated with each other, into said specification file memory means.

6. A method, as claimed in claim 5, further including:

a template downloading step for the first computer to fetch from said second computer template data, which constitute a model for patent specifications, prior to said draft preparation step; and said draft preparation step for said first computer to enter draft data for a patent specification prepared by said inventor's entering sentences into said template data, fetched at said template downloading step.

7. A method, as claimed in claim 5, further including, after said revised draft uploading step:

a notification step for said third computer to address an upload notification on said revised draft data to said inventor.

8. A method for preparing patent specifications including:

a draft preparation step for a first computer to enter patent specification draft data for a patent specification prepared by an inventor;

a draft uploading step for said first computer to transmit to a second computer respective patent specification draft data entered at said draft preparation step and a piece of invention report information for identifying the respective patent specification draft data;

a draft entry step for said second computer to enter respective patent specification draft data and said piece of invention report information for identifying the respective draft data, transmitted from said first computer, the data and the information being associated with each other, into a specification file memory means;

a draft downloading step for a third computer to fetch from said second computer patent specification draft data corresponding to a piece of invention report information designated by a patent-application-filing person;

a draft revision step for said third computer to revise the draft data fetched at said draft downloading step in accordance with an instruction by said patent-application-filing person;

a revised draft uploading step for said third computer to transmit to said second computer the draft data revised at said draft revision step and the piece of invention report information designated by said patent-application-filing person;

a revised draft entry step for said second computer to enter respective patent specification draft data and said piece of invention report information transmitted from said third computer, the data and the information being associated with each other, into said specification file memory means; and a patent application document sending step for said third computer to send an application form and said revised draft data for filing with the United States Patent and Trademark Office as patent application document data to the computer of the United States Patent and Trademark Office; and a proof sending step for said third computer to receive proof data, corresponding to said patent application document data, sent from the United States Patent and Trademark Office computer in response to said patent application document data, and send the proof data, associated with the piece of invention report information corresponding to the proof data, to said second computer to enter the proof data into said specification file memory means.

9. A method for preparing patent specifications including:

a draft preparation step for a first computer to enter patent specification draft data for a patent specification prepared by an inventor;

a draft uploading step for said first computer to transmit to a second computer respective patent specification draft data entered at said draft preparation step and a piece of invention report information for identifying the respective patent specification draft data;

a draft entry step for said second computer to enter respective patent specification draft data and said piece of invention report information for identifying the respective draft data, transmitted from said first computer, the data and the information being associated with each other, into a specification file memory means;

an entry step for a third computer to reference, when patent specification draft data are transmitted from said first computer to said second computer, the patent specification draft data, search a prior art reference database for reference data on the basis of the contents of the invention indicated by the patent specification draft data, associate searched reference data with the patent specification draft data and enter them into said specification file memory means;

a draft downloading step for a fourth computer to fetch from said second computer patent specification draft data corresponding to a piece of invention report information designated by patent-application-filing person and reference data related thereto;

a draft revision step for said fourth computer to revise the draft data fetched at said draft downloading step in accordance with an instruction by said patent-application-filing person having referenced to the related reference data fetched together with the draft data;

a revised draft uploading step for said fourth computer to transmit to said second computer the draft data revised at said draft revision step and said piece of invention report information designated by said patent-application-filing person; and a revised draft entry step for said second computer to enter respective patent specification draft data and said piece of invention report information for identifying the respective draft data, transmitted from said fourth computer, the data and the information being associated with each other, into said specification file memory means.

10. One or more recording media recording thereon a program enabling:

a first computer to execute draft preparation processing for entering patent specification draft data for a patent specification prepared by an inventor;

said first computer to execute draft upload processing to transmit to a second computer respective patent specification draft data entered by said draft preparation processing and a piece of invention report information for identifying the respective patent specification draft data;

said first computer to execute notification processing to address an upload notification on said patent specification draft data, entered by said draft preparation processing, to patent-application-filing person;

said second computer to execute draft entry processing to enter respective patent specification draft data and said piece of invention report information for identifying the respective draft data, transmitted from said first computer, the data and the information being associated with each other, into a specification file memory means;

a third computer to execute draft download processing to fetch from said second computer patent specification draft data corresponding to a piece of invention report information designated by a patent-application-filing person;

said third computer to execute draft revision processing to revise the draft data fetched by said draft download processing in accordance with an instruction by said patent-application-filing person;

said third computer to execute revised draft upload processing to transmit to said second computer the draft data revised by said draft revision processing and the piece of invention report information designated by said patent-application-filing person; and said second computer to execute revised draft entry processing to enter respective patent specification draft data and said piece of invention report information transmitted from said third computer, the data and the information being associated with each other, into said specification file memory means.

11. A group of recording media, wherein said program in claim 10 is divided into a plurality of portions and said portions are recorded on said media on a shared basis.

12. One or more recording media recording thereon a program enabling:

a first computer to execute draft preparation processing for entering patent specification draft data for a patent specification prepared by an inventor;

said first computer to execute draft upload processing to transmit to a second computer respective patent specification draft data entered by said draft preparation processing and a piece of invention report information for identifying the respective patent specification draft data;

said second computer to execute draft entry processing to enter respective patent specification draft data and said piece of invention report information for identifying the respective draft data, transmitted from said first computer, the data and the information being associated with each other, into a specification file memory means;

a third computer to execute draft download processing to fetch from said second computer patent specification draft data corresponding to a piece of invention report information designated by a patent-application-filing person;

said third computer to execute draft revision processing to revise the draft data fetched by said draft download processing in accordance with an instruction by said patent-application-filing person;

said third computer to execute revised draft upload processing to transmit to said second computer the draft data revised by said draft revision processing and the piece of invention report information designated by said patent-application-filing person;

said third computer to execute notification processing to address an upload notification on the draft data, entered by said draft revision processing, to said inventor; and said second computer to execute revised draft entry processing to enter respective patent specification draft data and said piece of invention report information transmitted from said third computer, the data and the information being associated with each other, into said specification file memory means.

13. One or more recording media recording thereon a program enabling:
- a first computer to execute draft preparation processing for entering patent specification draft data for a patent specification prepared by an inventor;
- said first computer to execute draft upload processing to transmit to a second computer respective patent specification draft data entered by said draft preparation processing and a piece of invention report information for identifying the respective patent specification draft data;
- said second computer to execute draft entry processing to enter respective patent specification draft data and said piece of invention report information for identifying the respective draft data, transmitted from said first computer, the data and the information being associated with each other, into a specification file memory means;
- a third computer to execute draft download processing to fetch from said second computer patent specification draft data corresponding to a piece of invention report information designated by a patent-application-filing person;
- said third computer to execute draft revision processing to revise the draft data fetched by said draft download processing in accordance with an instruction by said patent-application-filing person;
- said third computer to execute revised draft upload processing to transmit to said second computer the draft data revised by said draft revision processing and the piece of invention report information designated by said patent-application-filing person;
- said second computer to execute revised draft entry processing to enter respective patent specification draft data and said piece of invention report information transmitted from said third computer, the data and the information being associated with each other, into said specification file memory means;
- said third computer to execute patent application document send processing to send an application form and said revised draft data for filing with the Patent Office as patent application document data to the computer of said Patent Office; and
- said third computer to execute proof send processing to receive proof data, corresponding to said patent application document data, sent from said Patent Office computer in response to said patent application document data, and send the proof data, associated with the piece of invention report information corresponding to the proof data, to said second computer to enter the proof data into said specification file memory means.

14. One or more recording media recording thereon a program enabling:
- a first computer to execute draft preparation processing to enter patent specification draft data for a patent specification prepared by an inventor;
- said first computer to execute draft upload processing to transmit to a second computer respective patent specification draft data entered by said draft preparation processing and a piece of invention report information for identifying the respective patent specification draft data;
- said second computer to execute draft entry processing to enter respective patent specification draft data and said piece of invention report information for identifying the respective draft data, transmitted from said first computer, the data and the information being associated with each other, into a specification file memory means;
- a third computer to execute entry processing to reference, when patent specification draft data are transmitted from said first computer to said second computer, the patent specification draft data, search a prior art reference database for reference data on the basis of the contents of the invention indicated by the patent specification draft data, associate searched reference data with the patent specification draft data and enter them into said specification file memory means;
- a fourth computer to execute draft download processing to fetch from said second computer patent specification draft data corresponding to a piece of invention report information designated by patent-application-filing person and reference data related thereto;
- said fourth computer to execute draft revision processing to revise the draft data fetched by said draft download processing in accordance with an instruction by said patent-application-filing person having referenced to the related reference data fetched together with the draft data;
- said fourth computer to execute revised draft upload processing to transmit to said second computer the draft data revised by said draft revision processing and said piece of invention report information designated by said patent-application-filing person; and
- said second computer to execute revised draft entry processing to enter respective patent specification draft data and said piece of invention report information for identifying the respective draft data, transmitted from said fourth computer, the data and the information being associated with each other, into said specification file memory means.

* * * * *